(12) United States Patent
Unno

(10) Patent No.: US 8,052,572 B2
(45) Date of Patent: Nov. 8, 2011

(54) CONTROL DEVICE OF STRADDLE-TYPE VEHICLE, TRANSMISSION, AND STRADDLE-TYPE VEHICLE

(75) Inventor: Toshio Unno, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 844 days.

(21) Appl. No.: 12/108,335

(22) Filed: Apr. 23, 2008

(65) Prior Publication Data

US 2008/0287256 A1 Nov. 20, 2008

(30) Foreign Application Priority Data

Apr. 27, 2007 (JP) .................................. 2007-118597
Nov. 22, 2007 (JP) .................................. 2007-303410

(51) Int. Cl.
- F16H 61/662 (2006.01)
- B60W 10/04 (2006.01)
- B62D 61/02 (2006.01)
- G06F 19/00 (2006.01)

(52) U.S. Cl. .......... 477/43; 477/115; 477/905; 180/231; 701/56

(58) Field of Classification Search .................... 477/43, 477/44, 115, 122, 123, 905; 180/230, 231; 701/55, 56
See application file for complete search history.

(56) References Cited

U.S. PATENT DOCUMENTS

| | | | | |
|---|---|---|---|---|
| 5,655,991 A | * | 8/1997 | Lardy et al. ...................... | 477/46 |
| 6,033,338 A | * | 3/2000 | Jackson et al. ................... | 477/44 |
| 6,086,506 A | * | 7/2000 | Petersmann et al. ............ | 477/45 |
| 2002/0027031 A1 | * | 3/2002 | Miyata ........................... | 180/219 |
| 2007/0129212 A1 | * | 6/2007 | Lee ................................. | 477/115 |
| 2008/0194380 A1 | * | 8/2008 | Unno ............................. | 477/44 |
| 2008/0215217 A1 | * | 9/2008 | Unno ............................. | 701/54 |

FOREIGN PATENT DOCUMENTS

| | | |
|---|---|---|
| JP | 6-257665 | 9/1994 |
| JP | 10-184875 | 7/1998 |
| JP | 11-37282 | 2/1999 |
| JP | 2000-310316 | 11/2000 |
| JP | 2001-330120 | 11/2001 |
| JP | 2004-218825 | 8/2004 |
| JP | 2006-242266 | 9/2006 |
| WO | WO 2006/006506 | 1/2006 |

OTHER PUBLICATIONS

European Search Report with pages from Written Opinion dated Aug. 11, 2008.

* cited by examiner

*Primary Examiner* — Roger Pang
(74) *Attorney, Agent, or Firm* — Keating & Bennett, LLP

(57) ABSTRACT

The preferred embodiments of the present invention allow for easy shift-down and adjustment of a shift-down amount. According to some examples, a transmission (20) includes an electronically controlled transmission mechanism (21), and a control unit (5) that controls the transmission mechanism (21). The control unit (5) includes a transmission ratio control portion (55), a shift mode selection portion (52) that can select an AT mode and that shifts to a shift-down permission mode when a shift-down permission signal (101) is output in the AT mode, and a shift-down operation amount computation portion (51) that computes a shift-down operation amount based on a vehicle state of a motorcycle (1). The transmission ratio control portion (55) shifts down the transmission ratio of the transmission (20) based on the shift-down operation amount when a throttle (70) is operated in the shift-down permission mode.

25 Claims, 23 Drawing Sheets

CONTROL DEVICE OF STRADDLE-TYPE VEHICLE, TRANSMISSION, AND STRADDLE-TYPE VEHICLE

This application claims priority under 35 U.S.C. §119 to Japanese Patent Applications No. 2007-118597 filed on Apr. 27, 2007 and No. 2007-303410 filed on Nov. 22, 2007, the entire disclosures of which are incorporated herein by reference in their entireties.

BACKGROUND OF THE INVENTION

1. Field of the Invention

The present invention relates to, among other things, a control device of a straddle-type vehicle, a transmission, and a straddle-type vehicle.

2. Description of the Related Art

The following description sets forth the inventor's knowledge of related art and problems therein and should not be construed as an admission of knowledge in the prior art.

Electronically-controlled transmissions having a transmission gear ratio or a transmission ratio (hereinafter referred to as "transmission ratio") that can be controlled in a continuously variable manner (hereinafter referred to as "ECVT" (Electronically-controlled Continuously Variable Transmission)) are known. In an ECVT, the transmission ratio is automatically changed based on a transmission ratio map that indicates the relationship of the transmission ratio and a vehicle running state, such as, e.g., a vehicle speed, an engine speed, or a throttle opening degree. Accordingly, in a vehicle equipped with an ECVT (hereinafter referred to as "ECVT equipped vehicle"), there is no need for a rider speed change operation or clutch operation. As a result, presently, an ECVT is mounted in various types of vehicle.

However, in an ECVT equipped vehicle, the rider is not able to discretionarily change the transmission ratio to a transmission ratio other than that determined automatically in the transmission ratio map. In other words, other than the setting of the transmission ratio map, the transmission ratio cannot be discretionarily changed. Thus, it is comparatively problematic for the rider of an ECVT equipped vehicle to make active use of engine brake based on his/her intentions. More particularly, it is comparatively problematic for the rider to actively use stronger engine brake than that set by the transmission ratio map.

In addition, for example, in an ECVT equipped vehicle, it is also comparatively difficult for the rider to intentionally shift-down more than normal to increase vehicle acceleration, namely, perform a kick down operation, when the rider wishes to overtake another vehicle.

In light of the above circumstances, an ECVT equipped vehicle has been proposed that allows selection of either an AT mode in which the transmission ratio is automatically and continuously changed, or an MT mode in which the transmission ratio is manually changed by an operation of the rider. More specifically, for example, in Japanese Patent No. 2950957, an ECVT equipped vehicle is proposed in which the transmission ratio of the continuously variable transmission can be manually set in accordance with a position of a deceleration lever. Moreover, for example, in JP S62-175228, A, an ECVT equipped vehicle is proposed that is provided with a switch for forcibly changing the transmission ratio or manually performing shift-down.

In a known ECVT equipped vehicle in which it is possible to switch between the AT mode and the MT mode, in the AT mode, when the rider intentionally shifts down to accelerate or decelerate the vehicle, it is necessary for a complicated and troublesome operation to be performed. More particularly, in the AT mode, in order for the rider to intentionally shift-down to accelerate or decelerate the vehicle, it is necessary for the rider to perform operations at least three times, namely:

1. an operation for switching from the AT mode to the MT mode,
2. an operation for shifting down in the MT mode, and
3. an operation for switching from the MT mode to the AT mode.

Furthermore, when performing a shift-down operation in the MT mode, until the transmission ratio of the transmission becomes the most suitable transmission ratio, on some occasions, the rider himself/herself must operate the operation switch multiple times to adjust the transmission ratio. In other words, there is a problem, namely, the shift-down operation is complicated because the rider himself/herself must perform operations and adjustments related to the amount of the shift-down of the transmission ratio of the transmission.

Moreover, for example, even in the case of one type of MT mode, namely, even in an automatic MT mode in which the transmission ratio of the ECVT is automatically changed between a plurality of transmission ratios that are pre-set in a simulated, stepped manner, the problem of a complicated shift-down operation similarly occurs.

Also, even in the manual MT mode in which the transmission ratio of the ECVT is changed between the plurality of transmission ratios that are pre-set by operation of the rider, for example, when the rider wishes to shift-down a great amount, it is necessary for him/her to perform the shift-down operation multiple times. As a result, even in the case of the manual MT mode, similarly, the problem of a complicated shift-down operation for a suitable amount of shift-down sometimes occurs.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

The preferred embodiments of the invention were devised in light of the above-described and other problems, and the preferred embodiments make it easily possible to shift-down and to adjust the amount of shift-down.

Illustrative Examples

A first control device according to the preferred embodiments of the invention involves a control device for an electronically controlled transmission disposed between a driving source and a driving wheel of a straddle-type vehicle that is capable of continuously changing a transmission ratio. The straddle-type vehicle includes a shift-down permission switch, a throttle, a throttle operation member, and a throttle operation member sensor. The shift-down permission switch outputs a shift-down permission signal to the control device. The throttle is operated by the throttle operation member. The throttle operation member sensor detects at least one of an operation amount of the throttle operation member and an operation speed of the throttle operation member.

The first control device according to the preferred embodiments of the invention is provided with a transmission ratio control portion, a shift mode selection portion, and a shift-down operation amount computation portion. The transmission ratio control portion controls the transmission ratio of the transmission. The shift mode selection portion is capable of selecting, in accordance with a running state of the straddle-type vehicle, an AT mode in which the transmission ratio control portion continuously changes the transmission ratio of the transmission. In addition, the shift mode selection portion is configured such that, in the AT mode, the AT mode is shifted to a shift-down permission mode when the shift-down permission signal is output. The shift-down operation amount computation portion computes a shift-down operation amount based on a vehicle state of the straddle-type vehicle that includes at least one of the operation amount of the throttle operation member and the operation speed of the throttle operation member. The transmission ratio control portion, in the shift-down permission mode, shifts down the transmission ratio of the transmission based on the shift-down operation amount when the throttle is operated.

A second control device according to the preferred embodiments of the invention involves a control device for an electronically controlled transmission disposed between a driving source and a driving wheel of a straddle-type vehicle. The straddle-type vehicle includes a shift-down permission switch, a throttle, a throttle operation member, and a throttle operation member sensor. The shift-down permission switch outputs a shift-down permission signal to the control device. The throttle is operated by the throttle operation member. The throttle operation member sensor detects at least one of an operation amount of the throttle operation member and an operation speed of the throttle operation member.

The second control device according to the preferred embodiments of the invention is provided with a transmission ratio control portion, a shift mode selection portion, and a shift-down operation amount computation portion. The transmission ratio control portion controls a transmission ratio of the transmission. The shift mode selection portion is capable of selecting an MT mode in which the transmission ratio control portion changes the transmission ratio of the transmission between a plurality of predetermined transmission ratios. In addition, the shift mode selection portion being configured such that, in the MT mode, the MT mode is shifted to a shift-down permission mode when the shift-down permission signal is output. The shift-down operation amount computation portion computes a shift-down operation amount based on a vehicle state of the straddle-type vehicle that includes at least one of the operation amount of the throttle operation member and the operation speed of the throttle operation member. The transmission ratio control portion, in the shift-down permission mode, shifts down the transmission ratio of the transmission based on the shift-down operation amount when the throttle is operated.

A transmission according to the preferred embodiments of the invention is provided with an electronically controlled transmission mechanism, and a control unit. The electronically controlled transmission mechanism is disposed between a driving source and a driving wheel of a straddle-type vehicle and is capable of continuously changing a transmission ratio. The control unit controls the transmission mechanism. The straddle-type vehicle includes a shift-down permission switch, a throttle, a throttle operation member, and a throttle operation member sensor. The shift-down permission switch outputs a shift-down permission signal to the control device. The throttle is operated by the throttle operation member. The throttle operation member sensor detects at least one of an operation amount of the throttle operation member and an operation speed of the throttle operation member. The control unit includes a transmission ratio control portion, a shift mode selection portion, and a shift-down operation amount computation portion. The transmission ratio control portion controls the transmission ratio of the transmission. The shift mode selection portion is capable of selecting, in accordance with a running state of the straddle-type vehicle, an AT mode in which the transmission ratio control portion continuously changes the transmission ratio of the transmission. In addition, the shift mode selection portion is configured such that, in the AT mode, the AT mode is shifted to a shift-down permission mode when the shift-down permission signal is output. The shift-down operation amount computation portion computes a shift-down operation amount based on a vehicle state of the straddle-type vehicle that includes at least one of the operation amount of the throttle operation member and the operation speed of the throttle operation member. The transmission ratio control portion, in the shift-down permission mode, shifts down the transmission ratio of the transmission based on the shift-down operation amount when the throttle is operated.

A first straddle-type vehicle according to the preferred embodiments of the invention includes a driving source, a driving wheel, and a transmission. The driving wheel is driven by the driving source. The transmission includes an electronically controlled transmission mechanism and a control unit. The transmission mechanism is disposed between the driving source and the driving wheel of the straddle-type vehicle and is capable of continuously changing a transmission ratio. The control unit controls the transmission mechanism.

The first straddle-type vehicle according to the preferred embodiments of the invention includes a shift-down permission switch, a throttle, a throttle operation member, and a throttle operation member sensor. The shift-down permission switch outputs a shift-down permission signal to the control device. The throttle is operated by the throttle operation member. The throttle operation member sensor detects at least one of an operation amount of the throttle operation member and an operation speed of the throttle operation member. The control unit includes a transmission ratio control portion, a shift mode selection portion, and a shift-down operation amount computation portion. The transmission ratio control portion controls the transmission ratio of the transmission. The shift mode selection portion is capable of selecting, in accordance with a running state of the straddle-type vehicle, an AT mode in which the transmission ratio control portion continuously changes the transmission ratio of the transmission. In addition, the shift mode selection portion is configured such that, in the AT mode, the AT mode is shifted to a shift-down permission mode when the shift-down permission signal is output. The shift-down operation amount computation portion computes a shift-down operation amount based on a vehicle state of the straddle-type vehicle that includes at least one of the operation amount of the throttle operation member and the operation speed of the throttle operation member. The transmission ratio control portion, in the shift-down permission mode, shifts down the transmission ratio of the transmission based on the shift-down operation amount when the throttle is operated.

A second straddle-type vehicle according to the preferred embodiments of the invention includes a driving source, a driving wheel, and a transmission. The driving wheel is driven by the driving source. The transmission includes an electronically controlled transmission mechanism and a control unit. The transmission mechanism is disposed between the driving source and the driving wheel of the straddle-type vehicle. The control unit controls the transmission mechanism.

The second straddle-type vehicle according to the preferred embodiments of the invention includes a shift-down permission switch, a throttle, a throttle operation member, and a throttle operation member sensor. The shift-down permission switch outputs a shift-down permission signal to the control device. The throttle is operated by the throttle operation member. The throttle operation member sensor detects at least one of an operation amount of the throttle operation member and an operation speed of the throttle operation member. The control unit includes a transmission ratio control portion, a shift mode selection portion, and a shift-down operation amount computation portion. The transmission ratio control portion controls the transmission ratio of the transmission. The shift mode selection portion is capable of selecting an MT mode in which the transmission ratio control portion changes the transmission ratio of the transmission between a plurality of predetermined transmission ratios. In addition, the shift mode selection portion is configured such that, in the MT mode, the MT mode is shifted to a shift-down permission mode when the shift-down permission signal is output. The shift-down operation amount computation portion computes a shift-down operation amount based on a vehicle state of the straddle-type vehicle that includes at least one of the operation amount of the throttle operation member and the operation speed of the throttle operation member. The transmission ratio control portion, in the shift-down permission mode, shifts down the transmission ratio of the transmission based on the shift-down operation amount when the throttle is operated.

Illustrative Advantages:

Among other advantages, according to the preferred embodiments, shift-down and adjustment of the amount of shift-down can be easily performed.

Terminology Employed:

In this disclosure, all terms are to be given their broadest interpretation based on this disclosure. For reference, according to some of the preferred embodiments, the following terminology is employed herein.

Shift mode selection portion—As to this terminology, a "shift mode selection portion" can be a portion that can select just the AT mode. Furthermore, the "shift mode selection portion" can be a portion that can select modes other than the AT mode like the MT mode.

MT Mode—As to this terminology, an "MT mode" includes at least the automatic MT mode and the manual MT mode.

Shift-down permission mode—As to this terminology, a "shift-down permission mode" preferably involves a shift mode that automatically shifts down the transmission ratio of the transmission mechanism based on the shift-down operation amount computed based on the vehicle state of the motorcycle when the throttle is operated and the determined condition has been satisfied.

Shift-down permission AT mode—As to this terminology, a "shift-down permission AT mode" preferably involves a shift mode that continuously and automatically changes the transmission ratio of the transmission mechanism 21 after shift-down is performed as a result of operation of the throttle operation member 71.

Shift-down permission automatic MT mode—As to this terminology, a "shift-down permission automatic MT mode" preferably involves a shift mode that automatically changes the transmission ratio of the transmission mechanism 21 between the plurality of pre-set transmission ratios in a simulated, stepped manner after shift-down has been performed as a result of operation of the throttle operation member 71.

Shift-down permission manual MT mode—As to this terminology, a "shift-down permission manual MT mode" is a shift mode that fixes the transmission ratio of the transmission mechanism 21 in one of the plurality of pre-set transmission ratios after shift-down has been performed as a result of operation of the throttle operation member 71 so long as the rider does not perform a shift change operation.

Driving source—As to this terminology, a "driving source" preferably involves a device that generates power. The "driving source" can involve, for example, an internal combustion engine or an electric motor.

Electronically controlled transmission—As to this terminology, a "electronically controlled transmission" preferably involves a standard transmission that uses electric power to change the transmission ratio. The "electronically controlled transmission" includes transmissions that change the transmission ratio using a motor, and transmissions that change the transmission ratio using an electronically controlled hydraulic actuator. In other words, so long as electronic control is used, the type of the actuator that changes the transmission ratio is not particularly limited.

Push type switch—As to this terminology, a "push type switch" includes, for example, a push type switch that uses a lever, and a button type switch.

Motorcycle—As to this terminology, the language "motorcycle" is to be construed broadly and encompasses various motorized vehicles that are ridden by one or more rider, including, e.g., motorbikes, scooters, mopeds and other similar vehicles, which can include two wheeled vehicles and vehicles having more than two wheels.

Straddle Type Vehicle—As to this terminology, the language "straddle type vehicle" includes, for example, motorcycles, snow mobiles, all terrain vehicles (ATVs), four-wheeled buggies, etc., which often involve vehicles that can be turned, tilted or otherwise affected by the driver's weight position. The terminology straddle type vehicle is not limited to vehicles in which a driver and/or passenger sits with legs straddling on opposite sides of a portion of the vehicle (such as, e.g., straddling a seat), but also includes vehicles in which a driver and/or passenger's legs can extend across a substantial portion of the width of the passenger-supporting portion of the vehicle, such that, by way of example, while a driver may sit with legs forward in a scooter, a scooter is understood to be a straddle type vehicle due to the ability of a driver and/or passenger to extend their legs across a substantial portion of the width of the passenger-supporting portion. In this manner, the driver of a straddle type vehicle is typically able to distribute their weight widthwise across the vehicle and to turn, tilt or otherwise influence the vehicle by the driver's weight position.

The above and/or other inventions, aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The accompanying drawings, in which like reference numbers are used to designate like or similar parts, depict some preferred embodiments of the present invention, by way of example and not limitation, in which.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

First Embodiment

Structure of a Motorcycle 1.

Figure 1:
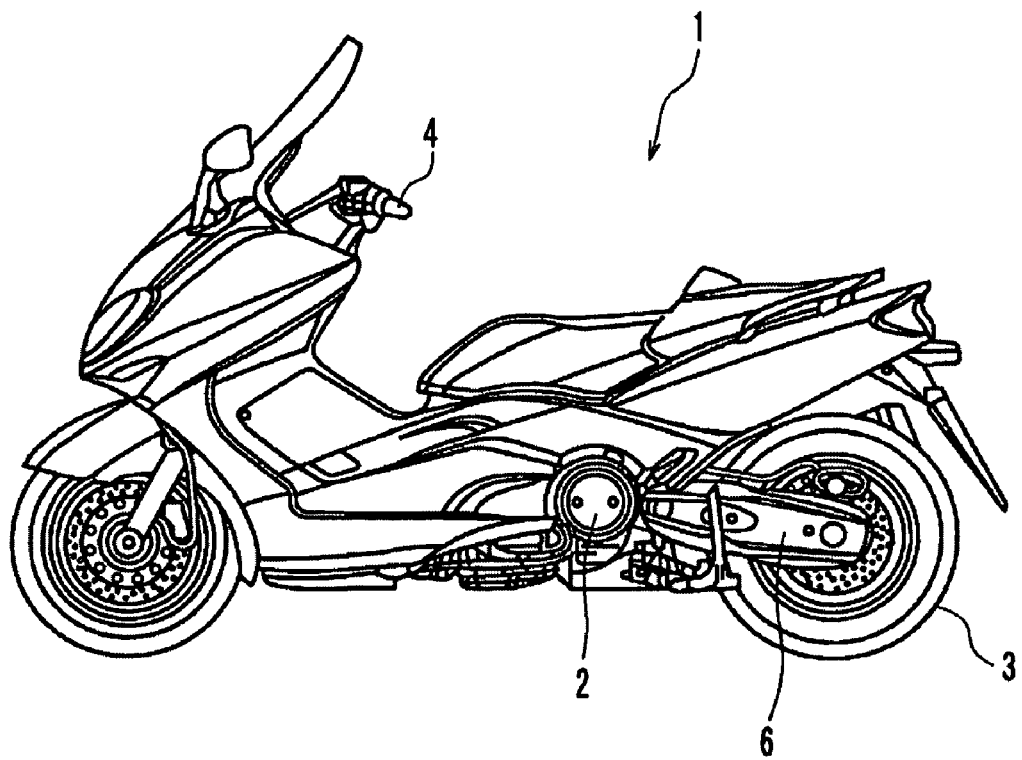
FIG. 1 is a side view of a motorcycle that embodies the invention.

In this embodiment, one example of an embodiment of the invention will be explained with reference to the motorcycle 1, which is a scooter type motorcycle. As shown in FIG. 1, the motorcycle 1 includes a handle 4, a power unit 2, and a rear wheel 3 as a driving wheel. The power unit 2 and the rear wheel 3 are connected by a force transmission mechanism 6.

(Handle 4)

Figure 2:
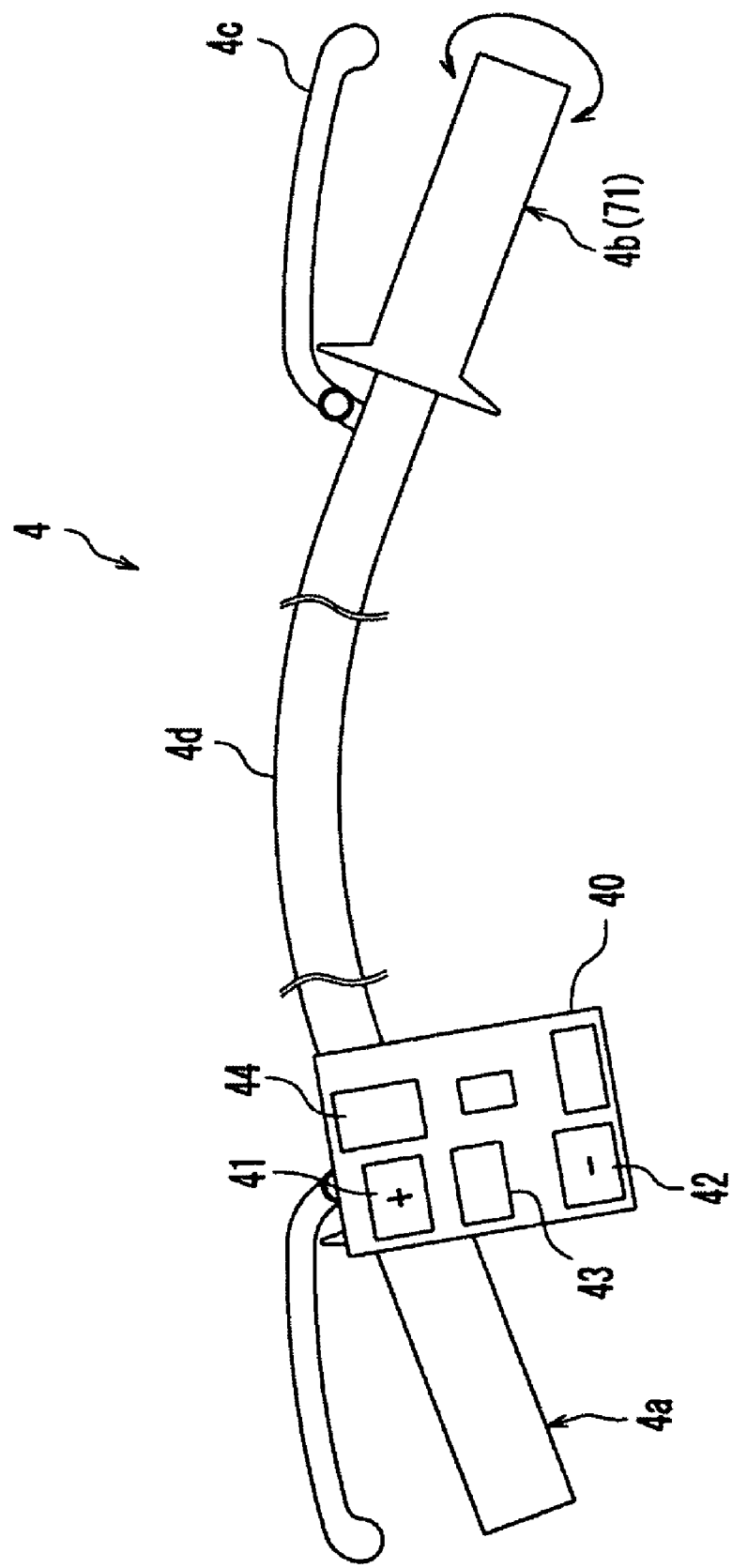
FIG. 2 shows an outline of the overall structure of a handle section.

FIG. 2 shows an outline of the overall structure of the handle 4. The handle 4 is provided with a handle bar 4d that is connected to a steering head pipe, not shown. The handle 4 is provided with a left grip 4a that is positioned at a left end section of the handle bar 4d, and a right grip 4b that is positioned at a right end section of the handle bar 4d. The right grip 4b forms a throttle operation member 71. The right grip 4b can rotate with respect to the handle bar 4d. The rider rotates the right grip 4b that acts as the throttle operation member 71, thereby operating a throttle 70 shown in FIG. 4 to adjust a throttle opening degree.

Figure 4:
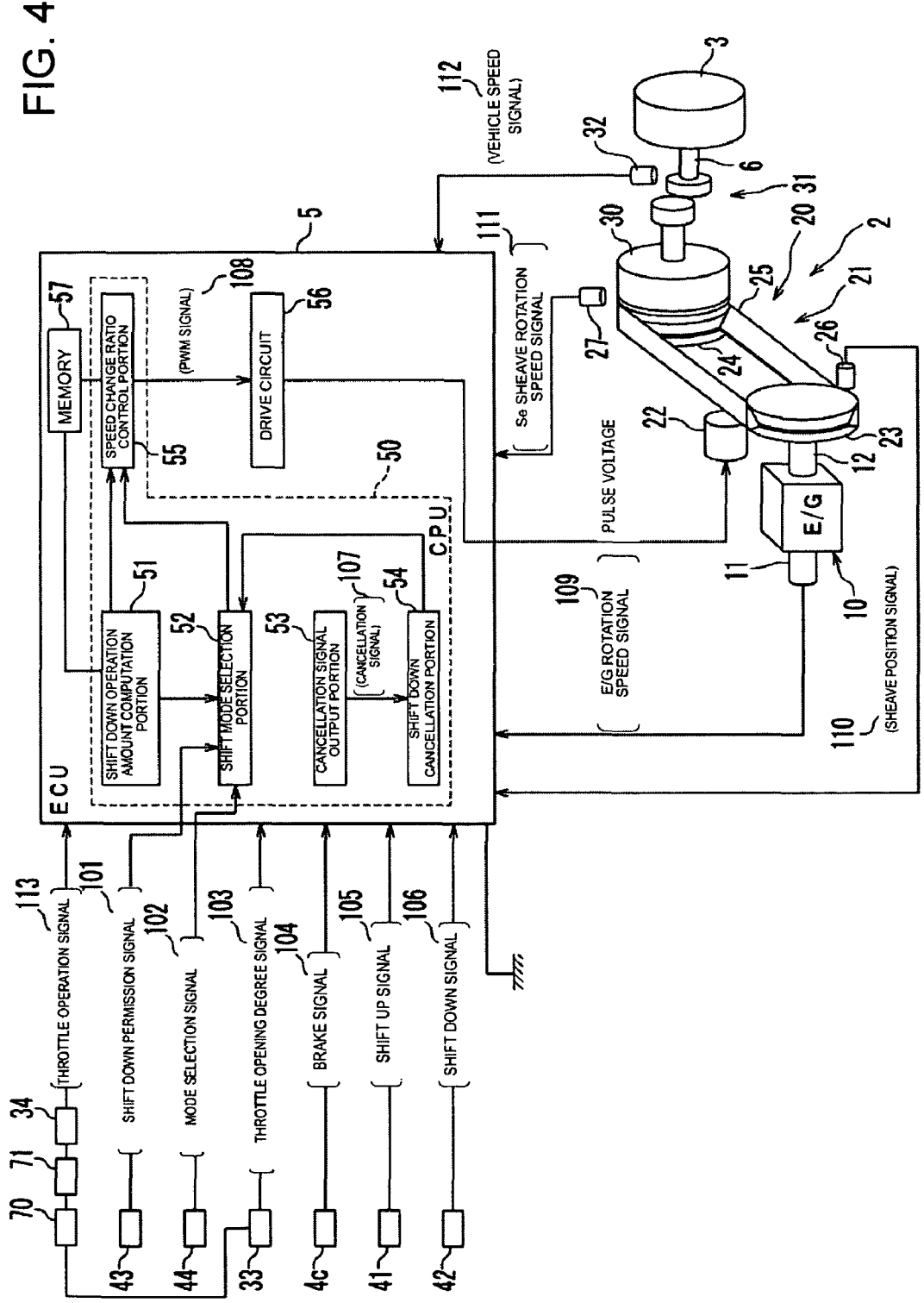
FIG. 4 is a block diagram of a control device.

Referring to FIG. 4, a throttle operation member sensor 34 is provided in the right grip 4b that acts as the throttle operation member 71. The throttle operation member sensor 34 detects an operation amount of the throttle operation member 71.

Here, the "operation amount of the throttle operation member 71" is the amount that the rider rotates the throttle operation member 71. Accordingly, in the case that the throttle 70 is directly operated by the throttle operation member 71, for example, when the throttle operation member 71 and the throttle 70 are connected by wire or the like, the "operation amount of the throttle operation member 71" corresponds one-to-one with the throttle opening degree. On the other hand, when the throttle 70 is not directly operated by the throttle operation member 71, for example, when the throttle 70 is operated by an actuator, there are occasions when the "operation amount of the throttle operation member 71" does not correspond with the throttle opening degree on a one-to-one basis.

Respective brake levers 4c are disposed in the vicinity of each grip 4a, 4b. When the rider operates the brake levers 4c, the brakes (not shown in the figures) of the motorcycle 1 are operated, and a brake signal 104 is output to an ECU 5 as will be described later.

A switch box 40 is disposed at the right side section of the left grip 4a. Various operation switches, which include a shift up switch 41, a shift-down switch 42, a shift-down permission switch 43, and a mode selection switch 44, are provided in the switch box 40.

Figure 3:
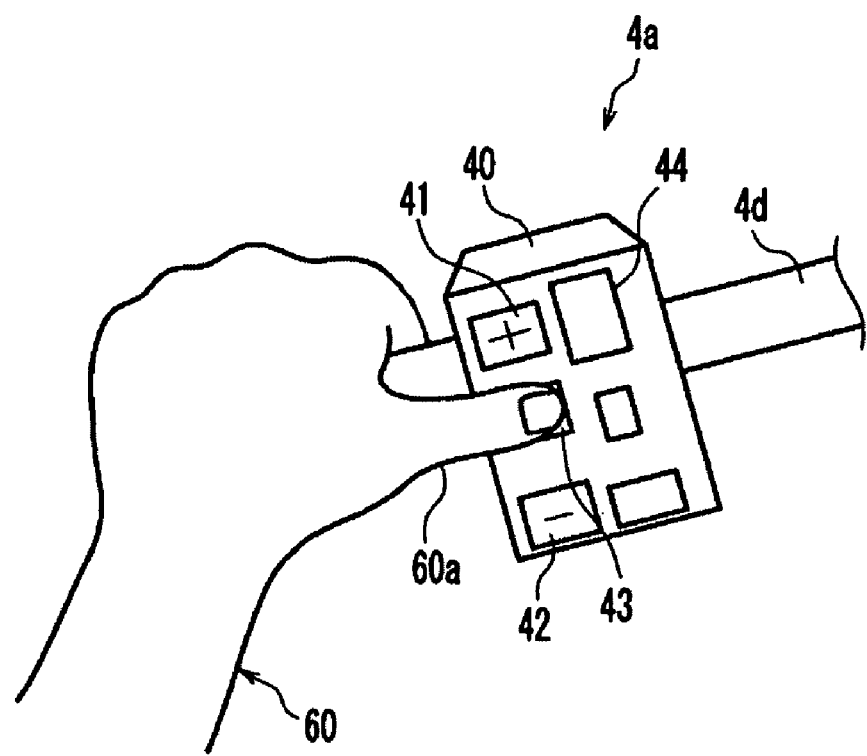
FIG. 3 shows an expanded outline of the overall structure of a left grip of the handle.

The various operation switches including the shift up switch 41, the shift-down switch 42, the shift-down permission switch 43, and the mode selection switch 44, as can be seen from FIG. 3, are disposed at positions that allow operation by a thumb 60a of a left hand 60 of the rider. More particularly, each type of operation switch is disposed in an upper surface of the switch box 40 that slopes slightly downward and rearward. In other words, each type of operation switch is disposed on the surface of the switch box 40 that faces the rider's side.

However, the invention is not limited to this configuration. For example, some of operating switches like the shift up switch 41 may be disposed to a rear surface side of the switch box 40 as seen from the rider such that the switches can be operated by the index finger. For example, the shift-down switch 42 may be disposed on the surface of the rider's side, while the shift up switch 41 is disposed on a surface to the rear surface side as seen from the rider. In other words, the shift-down switch 42 may be operated by the thumb 60a while the shift up switch 41 may be operated by the index finger. Furthermore, all of the operation switches may be disposed to the rear surface side of the switch box 40 as seen from the rider such that the operation switches can be operated by the index finger.

Note that, the positional location of the shift-down permission switch 43 and the mode selection switch 44 is not limited to the left grip 4a. For example, at least one of the shift-down permission switch 43 and the mode selection switch 44 may be disposed at the left side section of the right grip 4b. More particularly, an additional switch box may be provided at the left side section of the right grip 4b, and the at least one of the shift-down permission switch 43 and the mode selection switch 44 may be disposed in the additional switch box. In this case, the switch disposed in the additional switch box is favorably disposed at a position where it can be operated by the thumb of the rider's right hand or at a position where it can be operated by the index finger of the rider's right hand.

Also, for example, one of the shift-down permission switch 43 and the mode selection switch 44 may be disposed on the switch box 40 provided on the left grip 4a, and the other of the shift-down permission switch 43 and the mode selection switch 44 may be disposed on the switch box provided on the right grip 4b.

In this embodiment, the various types of operation switches like the shift up switch 41, the shift-down switch 42, the shift-down permission switch 43, and the mode selection switch 44 may be button type switches that are pushed. However, each of the various types of operation switches may be a lever that is pushed. Alternatively, each of the various types of operation switches may be a rotating switch with a knob that can be moved between a plurality of positions.

Referring to FIG. 3, among the various types of operation switches, the shift up switch 41, the shift-down switch 42, and the shift-down permission switch 43 are disposed closest to the rider's left hand 60. In other words, the shift up switch 41, the shift-down switch 42, and the shift-down permission switch 43 are disposed further to the outside in the vehicle width direction. The shift-down permission switch 43 is disposed between the shift up switch 41 and the shift-down switch 42. The mode selection switch 44 is disposed at a position that is further away from the left hand 60 than the shift up switch 41, the shift-down switch 42, and the shift-down permission switch 43. This is because the usage frequency of the mode selection switch 44 is lower than that of the shift up switch 41, the shift-down switch 42, and the shift-down permission switch 43. In this manner, it is favorable that the shift up switch 41, the shift-down switch 42, and the shift-down permission switch 43, which have a comparatively high usage frequency, are disposed closer toward the left hand 60 where operation is comparatively easy. However, the invention is not particularly limited to this configuration.

(Power Unit 2)

As can be seen from FIG. 4, an engine 10 that acts as driving source, an electronically controlled transmission 20, a centrifugal clutch 30, and a speed reduction mechanism 31 are provided. The transmission 20 is provided with a transmission mechanism 21, and a motor 22 that acts as an actuator. The motor 22 changes the transmission ratio of the transmission mechanism 21.

The transmission mechanism 21 is provided with a primary sheave 23 and a secondary sheave 24. The primary sheave 23 is provided on an output shaft 12 of the engine 10, and rotates along with rotation of the output shaft 12. A belt 25 with a generally V-shaped cross section is wound around the primary sheave 23 and the secondary sheave 24. The motor 22 is attached to the primary sheave 23. The width of a belt groove of the primary sheave 23 around which the belt 25 is wound is changed by the motor 22. As a result, the transmission ratio of the transmission mechanism 21 can be continuously changed. More particularly, the transmission ratio of the transmission mechanism 21 can be steplessly changed.

The secondary sheave 24 is connected to the speed reduction mechanism 31 via the centrifugal clutch 30. In addition, the speed reduction mechanism 31 is connected to the rear wheel 3 via the force transmission mechanism 6 such as a belt, a chain, or a drive shaft.

The centrifugal clutch 30 is engaged and disengaged in accordance with the rotation speed of the secondary sheave 24. More specifically, when the rotation speed of the secondary sheave 24 is less than a determined rotation speed, the centrifugal clutch 30 is disengaged. Accordingly, rotation of the secondary sheave 24 is not transmitted to the rear wheel 3. On the other hand, if the rotation speed of the secondary sheave 24 is equal to or more than the determined rotation speed, the centrifugal clutch 30 is engaged. Accordingly, rotation of the secondary sheave 24 is transmitted to the rear wheel 3 via the centrifugal clutch 30, the speed reduction mechanism 31 and the force transmission mechanism 6. As a result, the rear wheel 3 rotates.

Control Block of the Motorcycle 1.

Next, the control block of the motorcycle 1 will be explained with reference to FIG. 4. As shown in FIG. 4, control of the motorcycle 1 is principally performed by an ECU (electronic control unit) 5 that acts as a control device. The ECU 5 is provided with a memory 57 that stores various types of settings etc., a CPU (central processing unit) 50 that acts as a computation unit, and a drive circuit 56. The CPU 50 is provided with a shift-down operation amount computation portion 51, a shift mode selection portion 52, a cancellation signal output portion 53, a shift-down cancellation portion 54, and a transmission ratio control portion 55.

The various sensors and switches etc. are connected to the ECU 5. More particularly, the shift-down permission switch 43, the mode selection switch 44, the shift up switch 41, the shift-down switch 42, a throttle opening degree sensor 33, the brake levers 4c, an engine speed sensor 11, a sheave position detection sensor 26, a secondary sheave rotation speed sensor 27, the throttle operation member sensor 34 and a vehicle speed sensor 32 are connected to the ECU 5.

When operated by the rider, the shift-down permission switch 43 outputs a shift-down permission signal 101 to the ECU 5. When operated by the rider, the mode selection switch 44 outputs a mode selection signal 102 to the ECU 5. The throttle opening degree sensor 33 detects a throttle opening degree of the motorcycle 1. The throttle opening degree sensor 33 is connected to the throttle 70. The throttle opening degree sensor 33 outputs the detected throttle opening degree to the ECU 5 as a throttle opening degree signal 103. When operated by the rider, the brake levers 4c output a brake signal 104 to the ECU 5. More specifically, the brake levers 4c continue to output the brake signal 104 during the period from when the rider operates the brake levers 4c until when the rider releases operation of the brake levers 4c. When operated by the rider, the shift up switch 41 outputs a shift up signal 105 to the ECU 5. When operated by the rider, the shift-down switch 42 outputs a shift-down signal 106 to the ECU 5.

The engine speed sensor 11 detects a rotation speed of the engine 10. The engine speed sensor 11 outputs the rotation speed of the engine 10 to the ECU 5 as an engine speed signal 109.

The sheave position detection sensor 26 is a sensor that detects the transmission ratio of the transmission mechanism 21. More particularly, the sheave position detection sensor 26 detects the width of the belt groove of the primary sheave 23. For example, in the case that the primary sheave 23 has a structure including a fixed sheave body, and a moveable sheave body having a position that can be relatively displaced with respect to the fixed sheave body as in this embodiment, the sheave position detection sensor 26 detects the position of the moveable sheave body with respect to the fixed sheave body. In addition, the sheave position detection sensor 26 outputs the position of the movable sheave body as a sheave position signal 110 to the ECU 5.

The secondary sheave rotation speed sensor 27 detects the rotation speed of the secondary sheave 24. The secondary sheave rotation speed sensor 27 outputs the detected rotation speed of the secondary sheave 24 to the ECU 5 as a secondary sheave rotation speed signal 111.

The vehicle speed sensor 32 detects the vehicle speed of the motorcycle 1. The vehicle speed sensor 32 outputs the detected vehicle speed to the ECU 5. Note that, the vehicle speed sensor 32 may be a sensor that detects the rotation speed of the rear wheel 3. However, for example, the vehicle speed sensor 32 may be a sensor that obtains the vehicle speed by detecting the rotation speed of an output shaft of the speed reduction mechanism 31. The vehicle speed sensor 32 may be a sensor that obtains the vehicle speed by detecting the rotation speed of the front wheel.

(Outline of the Control of the ECU 5)

The ECU 5 controls the engine 10. More particularly, the ECU 5 computes an engine speed that serves as a target based on the throttle opening degree signal 103, the vehicle speed signal 112 and the like. The ECU 5 adjusts an ignition timing of an ignition device (not shown in the figures) of the engine 10, a fuel supply amount supplied to the engine 10 and the like while monitoring the engine speed signal 109, thereby controlling the rotation speed etc. of the engine 10 to the computed target engine speed.

Furthermore, the ECU 5 also controls the transmission 20. More particularly, the ECU 5 computes a transmission ratio that serves as a target from the engine speed signal 109, the vehicle speed signal 112, etc. In addition, the ECU 5 detects the current transmission ratio of the transmission 20 based on the sheave position signal 110 etc. Also, the ECU 5 outputs a PWM (pulse-width modulation) signal 108 to the drive circuit 56 based on the computed target transmission ratio and the detected current transmission ratio. The drive circuit 56 applies a pulse voltage that accords with the input PWM signal 108 to the motor 22. Accordingly, the transmission ratio of the transmission 20 is controlled to the target transmission ratio.

Note that, in this embodiment, an explanation is given of an example in which the PWM controlled motor 22 acts as the actuator that changes the transmission ratio of the transmission mechanism 21. However, the type of actuator used in the invention to change the transmission ratio of the transmission 20 is not particularly limited. For example, the actuator that changes the transmission ratio of the transmission 20 may be a PAM (pulse amplitude modulation) controlled motor. In addition, the actuator that changes the transmission ratio of the transmission 20 may be a step motor. Alternatively, the actuator that changes the transmission ratio of the transmission 20 may be a hydraulic actuator or the like.

Next, the control of the transmission ratio of the transmission 20 will be explained in more detail. First, selection of the shift mode will be explained with reference to FIG. 5 etc.

(Shift Mode Selection)

Figure 5:
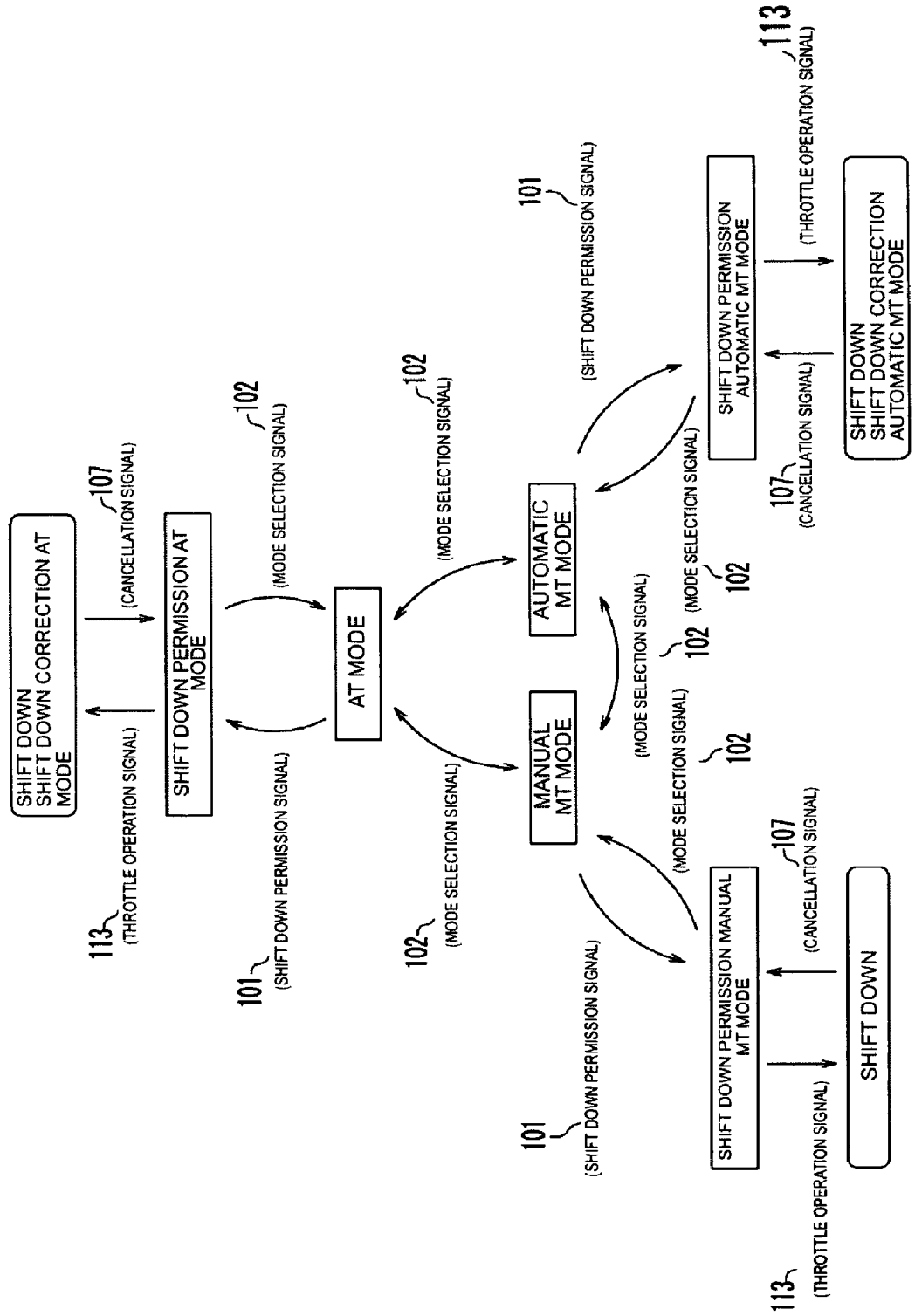
FIG. 5 is a conceptual diagram showing shift modes.

In the motorcycle 1, it is possible to select an AT mode, a manual MT mode and an automatic MT mode. As shown in FIG. 4 and FIG. 5, the AT mode, the manual MT mode, and the automatic MT mode can be selected by the rider operating the mode selection switch 44.

Referring to FIG. 4, when the rider operates the mode selection switch 44, the mode selection signal 102 from the mode selection switch 44 is output to the ECU 5. More particularly, the mode selection signal 102 is output to the shift mode selection portion 52 in the ECU 5. When the mode selection signal 102 is input to the shift mode selection portion 52, as shown in FIG. 5, the shift mode is switched from the current shift mode. For example, if the current shift mode is the AT mode, if the rider operates the mode selection switch 44 once, the AT mode is switched to the automatic MT mode. If the rider then operates the mode selection switch 44 once again, this time, the automatic MT mode is switched to the manual MT mode. And, if the rider operates the mode selection switch 44 once again, the manual mode is switched to the original AT mode. In other words, each time the mode selection switch 44 is operated the mode selection signal 102 is output, thereby successively switching the shift mode. When the shift mode is changed in this manner the transmission ratio control portion 55 controls the transmission ratio of the transmission 20 in accordance with the shift mode that has been changed to.

Note that, in this embodiment, an example is explained in which the shift mode is successively changed each time the mode selection switch 44 is operated. However, for example, a mode selection switch for selecting the AT mode, a mode selection switch for selecting the automatic MT mode, and a mode selection switch for selecting the manual MT mode may be separately provided.

"AT Mode"

The "AT mode" is a mode in which the transmission ratio of the transmission 20 is continuously and automatically changed by the transmission ratio control portion 55 in accordance with the running state of the motorcycle 1. In other words, the "AT mode" is a mode in which the transmission ratio of the transmission 20 is continuously and steplessly changed in accordance with the running state of the motorcycle 1. The "AT mode" may be a mode in which, for example, the transmission ratio control portion 55 continuously and automatically changes the transmission ratio of the transmission 20 based on a transmission ratio map that is determined in advance.

The transmission ratio map is stored in the memory 57 in the ECU 5, and defines the relationship of the running state of the motorcycle 1 such as the vehicle speed, the engine speed and the throttle opening degree etc. and the transmission ratio. The transmission ratio control portion 55 shown in FIG. 4 computes a target transmission ratio based on the transmission ratio map, the vehicle speed signal 112, the engine speed signal 109 etc. The transmission ratio control portion 55 outputs to the drive circuit 56 a PWM signal 108 based on the computed target transmission ratio, the sheave position signal 110, and the secondary sheave rotation speed signal 111. The drive circuit 56 applies a pulse voltage to the motor 22 based on the PWM signal 108. As a result, the motor 22 is driven, thereby adjusting the width of the belt groove of the primary sheave 23. Accordingly, the transmission ratio of the transmission 20 is changed until the target transmission ratio is reached.

"MT Mode"

On the other hand, the "MT mode" is a mode in which the transmission ratio of the transmission 20 is automatically or manually changed between a plurality of transmission ratios that are determined in advance. Within the MT mode, the mode in which the transmission ratio of the transmission 20 is changed by the rider operating an operation switch like the shift up switch 41 and the shift-down switch 42 is the "manual MT mode". In other words, in the "manual MT mode" the shift change is performed by the rider. Note that, the "MT mode" is sometimes called a simulated MT mode in order to distinguish it from that in a normal manual transmission in which the transmission ratio is changed physically between a plurality of gears.

"Manual MT Mode"

Figure 6:
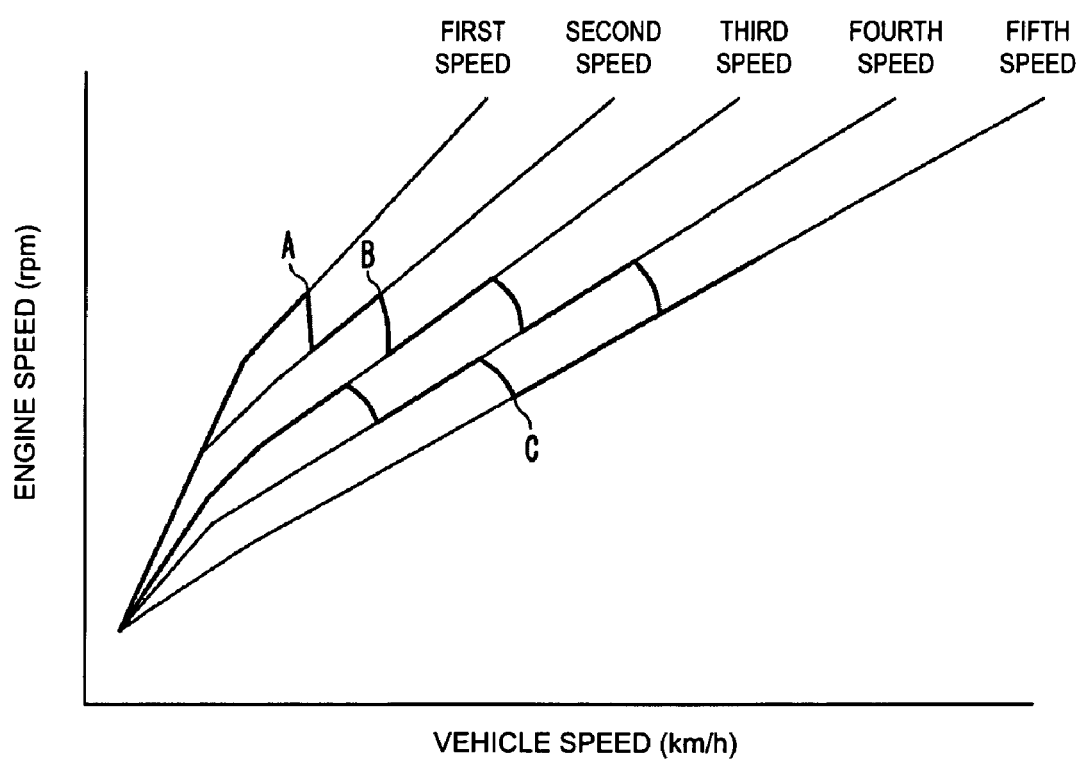
FIG. 6 is a V-N diagram that illustratively explains shift change in a manual MT mode.

More specifically, in this embodiment, as shown in FIG. 6, five almost fixed transmission ratios are set, namely, from the LOW side, a first speed, a second speed, a third speed, a fourth speed, a fifth speed. Note that, each transmission ratio from the first speed to the fifth speed may be completely fixed, or may, for example, be changed in accordance with the engine speed. More particularly, for example, as the engine speed becomes higher, each of the transmission ratios, namely, the first speed to the fifth speed, may be set closer to the top side. In the manual MT mode, as long as the rider does not operate the operation switches like the shift up switch 41 or the shift-down switch 42, the transmission ratio is fundamentally not changed. In other words, in the manual MT mode, as long as the rider does not operate the operation switches like the shift up switch 41 or the shift-down switch 42, the transmission ratio of the transmission 20 is fundamentally not changed automatically between each of the transmission ratios. However, for example, there are exceptional occasions when forcible shift-down may be performed in order to, for example, inhibit the engine from stalling when reducing speed of the motorcycle 1 or the like.

For example, to explain the case shown as an example in FIG. 6, when the motorcycle 1 starts to run in first speed, until the shift up switch 41 is operated, the transmission ratio of the transmission 20 remains as it is in the first speed. At point A, when the rider operates the shift up switch 41, as shown in FIG. 4, the shift up signal 105 is output to the ECU 5 from the shift up switch 41. When the shift up signal 105 is input to the ECU 5, the transmission ratio control portion 55 in the ECU 5 outputs the PWM signal 108 to the drive circuit 56 in order to change the transmission ratio of the transmission 20 from the first speed to the second speed. The drive circuit 56 applies the pulse voltage to the motor 22 in accordance with the PWM signal 108. As a result, as can be seen from FIG. 6, the transmission ratio of the transmission 20 is switched to the second speed. Similarly, at point B, when the shift up switch 41 is operated again, the transmission ratio of the transmission 20 is switched to the third speed.

On the other hand, for example, at point C in FIG. 6, when the shift-down switch 42 is operated, as shown in FIG. 4, the shift-down signal 106 is output to the ECU 5 from the shift-down switch 42. When the shift-down signal 106 is input to the ECU 5, the transmission ratio control portion 55 in the ECU 5 outputs the PWM signal 108 to the drive circuit 56 in order to change the transmission ratio of the transmission 20 from the fifth speed to the fourth speed. The drive circuit 56 applies the pulse voltage to the motor 22 in accordance with the PWM signal 108. As a result, as shown in FIG. 6, the transmission ratio of the transmission 20 is switched from the fifth speed to the fourth speed.

"Automatic MT Mode"

Within the MT mode, the mode in which the transmission ratio of the transmission 20 is automatically changed by the transmission ratio control portion 55 between the plurality of transmission ratios that are determined in advance without relying on the operation of the rider is the "automatic MT mode".

Figure 7:
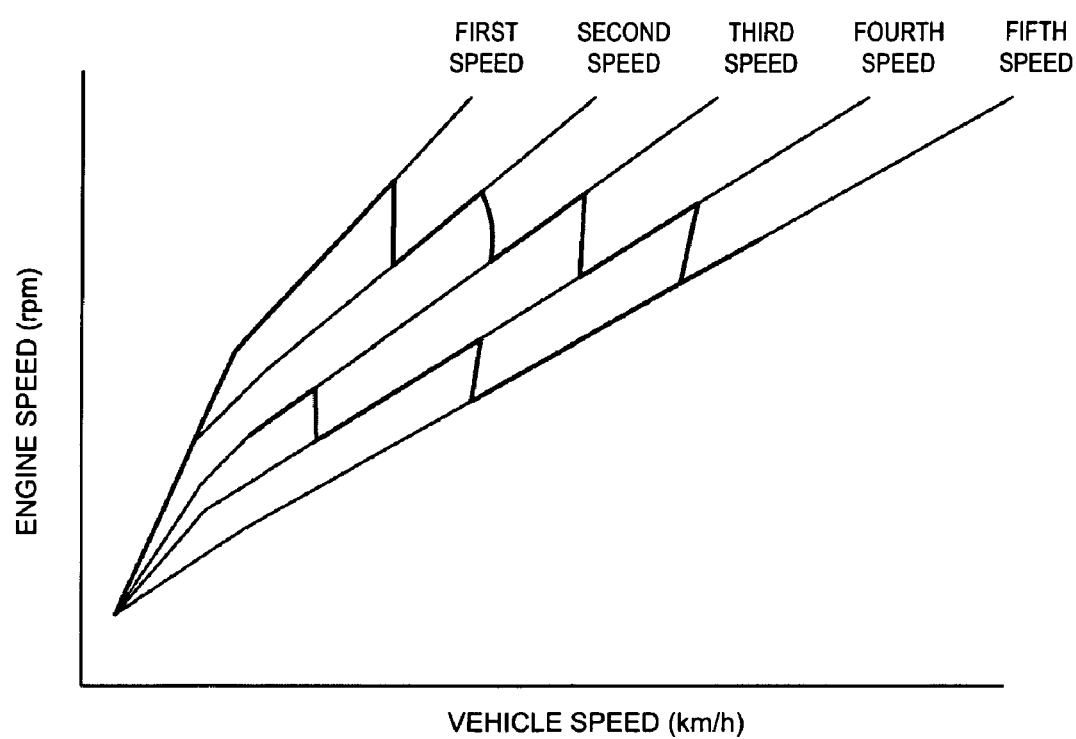
FIG. 7 is a V-N diagram that illustratively explains shift change in an automatic MT mode.

Referring to the example shown in FIG. 7, when the automatic MT mode is selected by the shift mode selection portion 52, the transmission ratio of the transmission 20 is changed automatically along with change in the running state of the motorcycle 1 without relying on the operation of the rider. However, in the case of the automatic MT mode, unlike in the AT mode, the transmission ratio is not continuously changed. In other words, in the case of the automatic MT mode, the transmission ratio is not changed steplessly as in the AT mode. In other words, in the automatic MT mode, the transmission ratio of the transmission 20 is automatically changed between the transmission ratios set in advance.

Note that, in the automatic MT mode, the timing of shift change is set to be different depending on, for example, the throttle opening degree. More particularly, when shifting up, when the rider has opened the throttle 70 to a great extent in order to accelerate comparatively rapidly (in other words, when the throttle opening degree is large), shift change is performed at a comparatively high engine speed. On the other hand, when the rider has opened the throttle 70 to a small extent in order to accelerate comparatively slowly (in other words, when the throttle opening degree is small), shift change is performed at a comparatively low engine speed. When shifting down, as when shifting up, the timing of the shift change is set to be different depending on, for example, the throttle opening degree.

(Shift-Down Permission Mode)

"Outline of a Shift-Down Permission Mode"

As shown in FIG. 5, in this embodiment, it is possible to shift from each of the AT mode, the automatic MT mode and the manual MT mode to a shift-down permission mode. Here, the "shift-down permission mode" is a shift mode that allows, based on operation of the throttle operation member 71, shift-down to be performed in accordance with the operation state of the throttle operation member 71. In other words, the "shift-down permission mode" is a shift mode that allows a shift-down that has a shift-down amount that reflects the rider's intention when the rider tries to actively use kick down or engine brake by shifting down the transmission ratio of the transmission mechanism 21.

"Shift-Down Permission AT Mode"

More specifically, in this embodiment, it is possible to shift from the AT mode to a shift-down permission AT mode". Here, the "shift-down permission AT mode" is a shift mode within the shift-down permission mode that continuously and automatically changes the transmission ratio of the transmission mechanism 21 after shift-down has been performed in accordance with the operation state of the throttle operation member 71.

Figure 8:
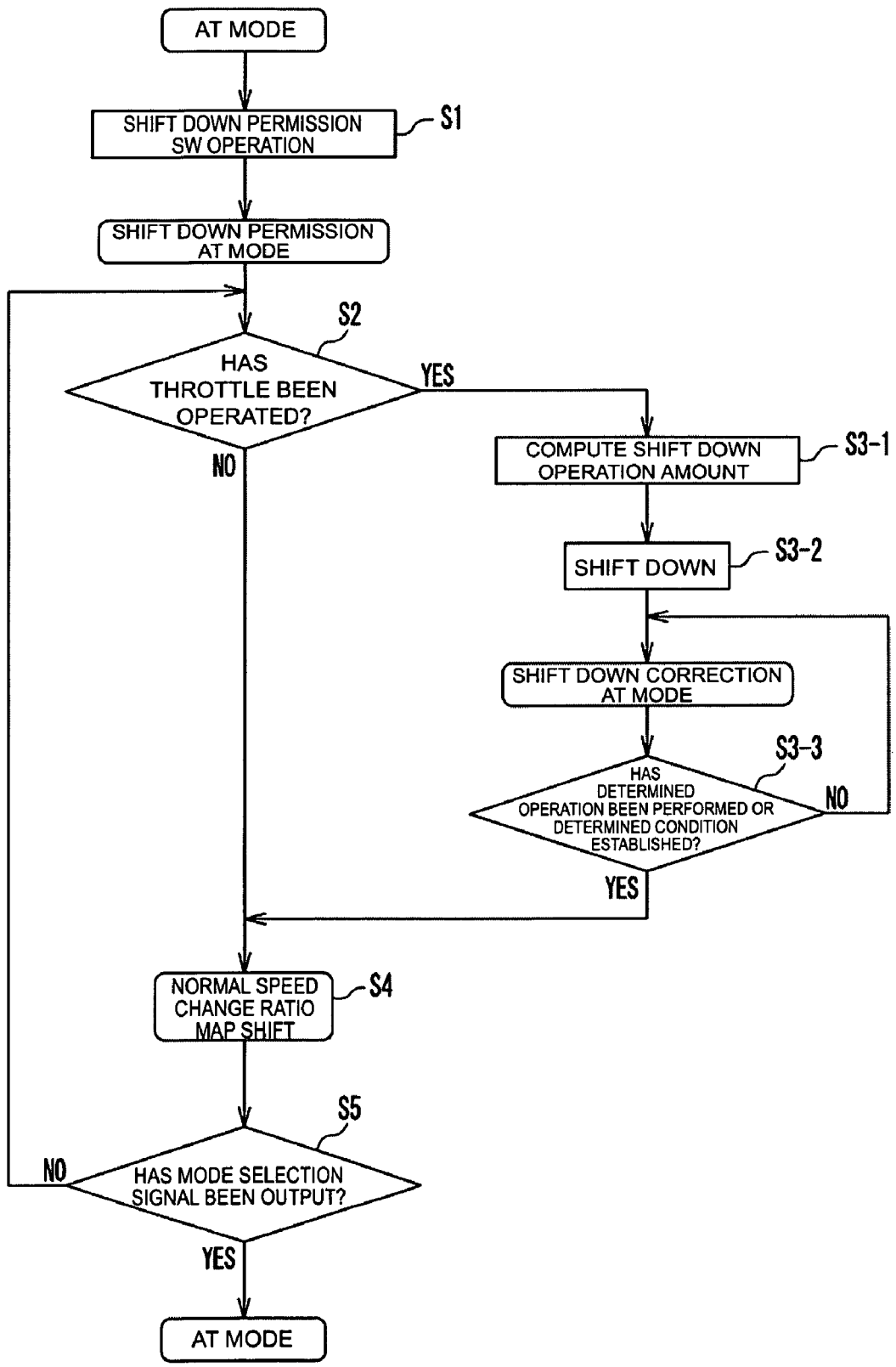
FIG. 8 is a flow chart of a shift-down permission AT mode.

As can be seen from FIG. 8, at step S1, when the rider operates the shift-down permission switch 43, the shift-down permission signal 101 is output to the ECU 5 from the shift-down permission switch 43 as shown in FIG. 4. More particularly, the shift-down permission signal 101 is output to the shift mode selection portion 52. When the shift-down permission signal 101 is input to the shift mode selection portion 52, the shift mode selection portion 52 shifts from the AT mode to the shift-down permission AT mode. In other words, when the shift-down permission signal 101 is input, the shift mode selection portion 52 selects the shift-down permission AT mode instead of the AT mode. Note that, even after shifting to the shift-down permission AT mode, until the throttle operation member 71 is operated, the transmission ratio of the transmission mechanism 21 is controlled based on the normal transmission ratio map that is used to control the transmission ratio of the transmission mechanism 21 in the normal AT mode.

Next, as shown in FIG. 8, at step S2, it is determined whether or not the throttle operation member 71 has been operated. More particularly, a throttle operation signal 113 is output to the ECU 5 from the throttle operation member sensor 34 shown in FIG. 4. The ECU 5 determines whether or not the throttle operation member 71 has been operated by the rider based on the throttle operation member signal 113. At step S2, if it is determined that the throttle operation member 71 has been operated, the routine proceeds to step S3-1.

At step S3-1, a shift-down operation amount computation portion 51 computes the shift-down operation amount. Here, the "shift-down operation amount" is an amount by which the transmission ratio of the transmission mechanism 21 is caused to change and which is computed based on the vehicle states of the motorcycle 1, which include at least one of an operation amount of the throttle operation member 71 and an operation speed of the throttle operation member 71. Generally speaking, the "shift-down operation amount" is a shift-down amount that is desired by the rider and that can be estimated from the vehicle states of the motorcycle 1. Here, the "shift-down amount" is the change amount to the LOW side of the transmission ratio of the transmission mechanism 21.

More particularly, in this embodiment, the shift-down operation amount is computed using a shift-down operation amount map memorized in the memory 57. Here, the shift-down operation amount map is a map that shows the inter-relationship between the vehicle states of the motorcycle 1 and the shift-down operation amount. Note that, here, an example will be explained of a case where the shift-down operation amount map is a map that shows the inter-relationship of the shift-down operation amount and the operation amount of the throttle operation member 71, the operation speed of the throttle operation member 71, the vehicle speed of the motorcycle 1 and the rotation speed of the engine 10.

However, so long as the shift-down operation amount map is a map that shows the inter-relationship of at least one of the vehicle states of the motorcycle 1 and shift-down operation amount, the invention is not particularly limited. For example, the shift-down operation amount map may be a map that shows the inter-relationship of the shift-down operation amount and just the operation amount of the throttle operation member 71 and the operation speed of the throttle operation member 71. In addition, for example, the shift-down operation amount map may be a map that shows the inter-relationship between the shift-down operation amount and a function that takes the operation amount of the throttle operation member 71 and the operation speed of the throttle operation member 71 as variables.

Note that, the form of the shift-down operation amount map is not particularly limited. The form of the shift-down operation amount map may be determined as appropriate in accordance with the type of the motorcycle 1, the usage environment, or the like. For example, if the motorcycle 1 is a model type like a motorcycle that frequently accelerates and decelerates, the form of the shift-down operation amount map may be a form that computes a comparatively large shift-down operation amount. On the other hand, if the motorcycle 1 is a vehicle like a scooter motorcycle that has a comparatively low displacement and that is not required to accelerate and decelerate that substantially, the form of the shift-down operation amount map may be a form that computes a comparatively small shift-down operation amount.

In this embodiment, at step S3-1, the shift-down operation amount computation portion 51 reads the shift-down operation amount map memorized in the memory 57. The shift-down operation amount computation portion 51 computes the shift-down operation amount by applying to the shift-down operation amount map the operation amount of the throttle operation member 71 obtained from the throttle operation signal 113, the operation speed of the throttle operation member 71 computed by differentiating the operation amount by time, the vehicle speed obtained from the vehicle speed signal 112, and the engine speed obtained from the engine speed signal 109.

Note that the configuration may be such that the shift-down operation amount is always constant with respect to the vehicle speed, or is not constant with respect to the vehicle speed. In other words, the computed shift-down operation amount may be a function with respect to the vehicle speed. More particularly, in the case that the running state of the motorcycle 1 is the same, the shift-down operation amount may be set to become larger as the vehicle speed increases. In addition, in the case that the running state of the motorcycle 1 is the same, the shift-down operation amount may be set to become smaller as the vehicle speed increases.

Next, after step S3-1, step S3-2 is performed. At step S3-2, shift-down of the transmission ratio of the transmission mechanism 21 is performed based on the shift-down operation amount computed at step S3-1. More particularly, the shift-down operation amount computation portion 51 outputs the computed shift-down operation amount to the transmission ratio control portion 55. The transmission ratio control portion 55 shifts down the transmission ratio of the transmission mechanism 21 by exactly the input shift-down operation amount. Following this, as shown in FIG. 8, the shift-down permission AT mode is shifted to a shift-down correction AT mode. Note that, in the shift-down correction AT mode, it is favorable to set an upper limit for the engine speed so that the engine does not over-rev.

Note that, at step S2, in the case that it is determined that the throttle operation member 71 has been operated, at step S3-2, it is not necessarily the case that the transmission ratio of the transmission mechanism 21 is shifted down. For example, at step S2, even if it is determined that the throttle operation member 71 has been operated, if the throttle 70 has been operated extremely slowly and the operation amount of the throttle 70 is small, at step S3-1, the shift-down operation amount computation portion 51 computes that the shift-down operation amount is zero. In other words, for example, if the operation amount of the throttle 70 is equal to or less than a determined operation amount, and the operation speed of the throttle 70 is equal to or less than a determined speed, at step S3-1, the shift-down operation amount computation portion 51 computes that the shift-down operation amount is zero. This is done because in this situation there is a high probability that the rider does not have the intention to actively try to use the kick down operation or engine brake by shifting down.

Furthermore, also in the case that it is determined that shifting down is not favorable, for example, such as when it is anticipated that the motorcycle 1 will slip if shift-down is performed, at step S3-1, the shift-down operation amount computed by the shift-down operation amount computation portion 51 is zero. In other words, in this embodiment, the vehicle state of the motorcycle 1 used when computing the shift-down operation amount includes, acceleration of the motorcycle 1 computed by differentiating by time the vehicle speed detected by the vehicle speed sensor 32, a slip state and the like, along with the operation amount and the operation speed of the throttle operation member 71, the vehicle speed, and the engine speed.

Next, after step S3-2, step S3-3 is performed. At step S3-3, it is determined by the ECU 5 whether or not a determined operation has been performed on the motorcycle 1, and whether or not a determined condition of the motorcycle 1 is satisfied. At step S3-3, if it is determined that the determined operation has not been performed on the motorcycle 1, and that the determined condition of the motorcycle 1 is not satisfied, the shift-down correction AT mode continues to be used. On the other hand, if it is determined at step S3-3 that the determined operation has been performed on the motorcycle 1 or that the determined condition of the motorcycle 1 has been satisfied, the routine proceeds to step S4. Then, at step S4, a cancellation signal 107 is output to the shift-down cancellation portion 54 from the cancellation signal output portion 53. As a result, the shift-down correction AT mode is cancelled, and control of the transmission ratio of the transmission mechanism 21 returns to being based on the normal transmission ratio map used to control the transmission ratio of the transmission mechanism 21 in the normal AT mode before step S3-2 is performed. In other words, as shown in FIG. 5, at step S4, the shift-down permission AT mode is returned to from the shift-down correction AT mode.

Note that, in this case, the shift-down permission AT mode is continued, as is, without returning to the AT mode. In other words, in the shift-down permission AT mode, when the throttle operation member 71 is operated, this causes a shift to the shift-down correction AT mode. Following this, if the determined operation is performed on the motorcycle 1, or the determined condition of the motorcycle 1 is satisfied, the shift-down permission AT mode is returned to from the shift-down correction AT mode.

At step S2, also in the case that it is determined that the throttle operation member 71 has not been operated, the routine proceeds to step S4. More specifically, if it is determined that the throttle operation member 71 has not been operated at step S2, the shift to the shift-down correction AT mode is not performed, and control of the transmission ratio of the transmission mechanism 21 continues to be performed based on the normal transmission ratio map that is used to control the transmission ratio of the transmission mechanism 21 in the normal AT mode.

Next, following step S4, step S5 is performed. At step S5, it is determined whether or not the mode selection switch 44 has been operated and the mode selection signal 102 has been output to the ECU 5 from the mode selection switch 44. If it is determined that the mode selection signal 102 has been output to the ECU 5 at step S5, as shown in FIG. 5 and FIG. 8, the AT mode is returned to from the shift-down permission AT mode. On the other hand, if it is determined that the mode selection signal 102 has not been output to the ECU 5 at step S5, step S2 is returned to again.

Note that, in this embodiment, an example is explained in which the setting is such that, when the mode selection signal 102 is output to the ECU 5, the AT mode is returned to from the shift-down permission AT mode. However, the invention is not limited to this setting. For example, the setting may be such that, when the shift-down permission signal 101 is output to the ECU 5 in the shift-down permission AT mode, the AT mode is returned to from the shift-down permission AT mode. Alternatively, the setting may be such that, when the shift up signal 105 or the shift-down signal 106 is output to the ECU 5, the AT mode is returned to from the shift-down permission AT mode.

—Shift-Down Correction AT Mode—

Next, the shift-down correction AT mode will be explained in even more detail with reference to FIG. 9. In the shift-down correction AT mode of this embodiment, instead of the transmission ratio computed from the transmission ratio map used in computation of the transmission ratio of the transmission mechanism 21 in the normal AT mode, the transmission ratio is constantly controlled to a transmission ratio that is shifted down by exactly the shift-down operation amount computed at step S3-1. In other words, in the shift-down correction AT mode of this embodiment, the transmission ratio is computed using a new transmission ratio map that is obtained by shifting the transmission ratio map used to compute the transmission ratio of the transmission mechanism 21 in the normal AT mode by exactly the shift-down operation amount to the LOW side. Then, the transmission ratio of the transmission mechanism 21 is controlled to become the computed transmission ratio. As a result, at times, it is possible to shift-down to a region that is to the outside of a shift map X used in the AT mode, which would not be possible in the AT mode.

Figure 9:
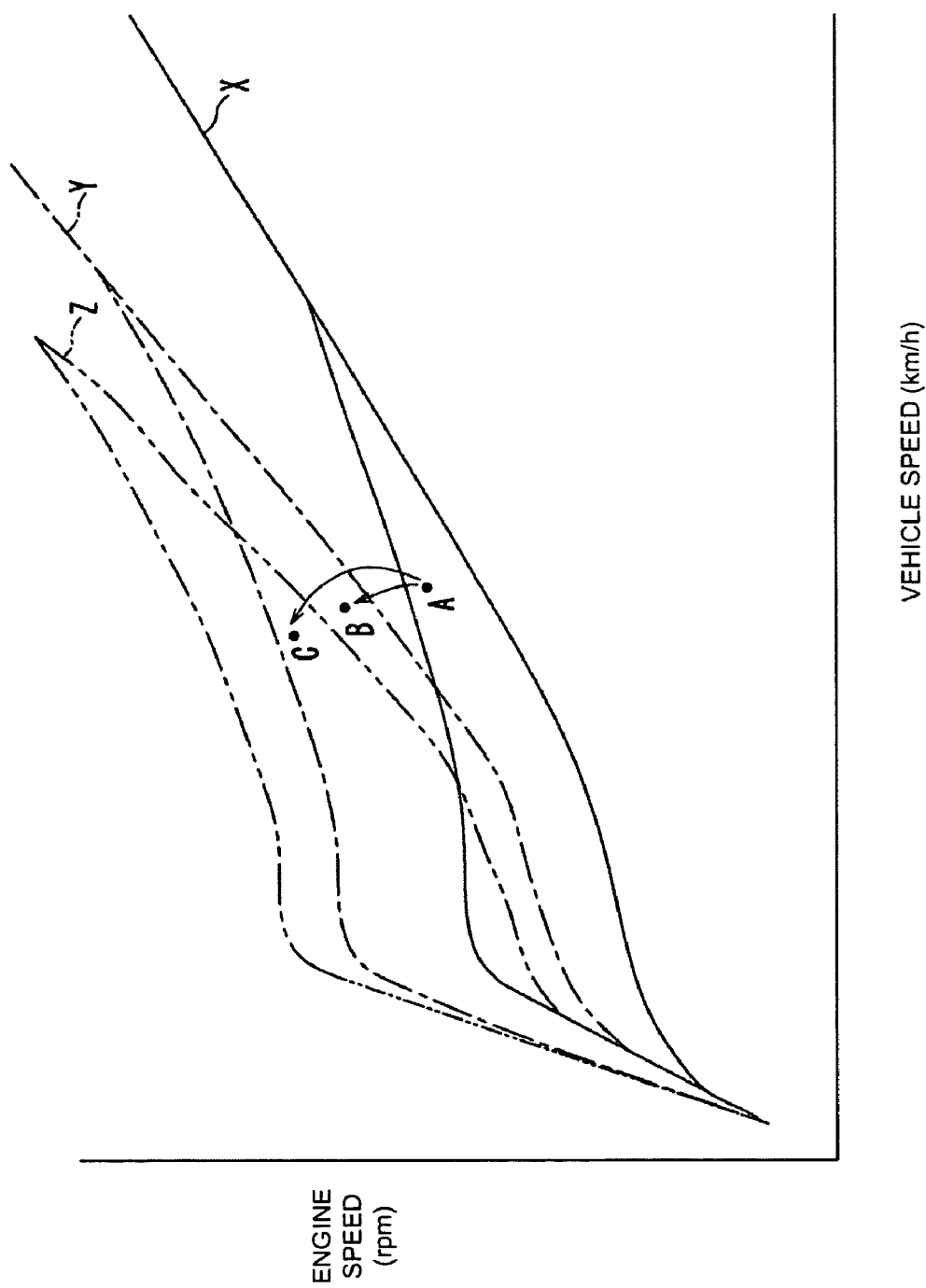
FIG. 9 is a V-N diagram of a shift-down correction AT mode.

To explain more concretely with reference to FIG. 9, a transmission ratio map X shown in FIG. 9, is the normal transmission ratio map used to compute the transmission ratio in the AT mode. On the other hand, transmission ratio maps Y, Z shown in FIG. 9 illustrate examples of transmission ratio maps used to compute the transmission ratio in the shift-down correction AT mode. In FIG. 9, for the sake of explanatory simplicity, among the plurality of transmission ratio maps used to compute the transmission ratio in the shift-down correction AT mode, only the transmission ratio maps Y and Z are drawn.

If the situation is like that shown in FIG. 9, if the shift-down operation amount computed when the throttle operation member 71 is operated is comparatively small in the shift-down permission AT mode, in the shift-down correction AT mode, the transmission ratio map Y is used in which the transmission ratio is shifted to the LOW side by exactly the comparatively small shift-down operation amount computed from the transmission ratio map X used in the AT mode. On the other hand, if the computed shift-down operation amount is comparatively large, in the shift-down correction AT mode, the transmission ratio map Z is used in which the transmission ratio is shifted to the LOW side by exactly the comparatively large shift-down operation amount computed from the transmission ratio map X used in the AT mode.

In this manner, in the shift-down correction AT mode, the transmission ratio map used to compute the transmission ratio is different depending on the computed shift-down operation amount. More particularly, as the computed shift-down operation amount becomes larger, the transmission ratio map used in the shift-down correction AT mode is a map that is shifted further to the LOW side. In other words, as the computed shift-down operation amount becomes larger, the transmission ratio map used in the shift-down correction AT mode is a map set further toward a high engine speed.

Note that, the transmission ratio map used in the shift-down correction AT mode is not necessarily limited to a map in which the transmission ratio is shifted to the LOW side by exactly the shift-down operation amount computed from the transmission ratio map X used in the AT mode. More particularly, in some cases, the transmission ratio map used in the shift-down correction AT mode is not a map in which the transmission ratio is shifted to the LOW side by exactly the shift-down operation amount computed from the transmission ratio map X. For example, this may occur when the computed shift-down operation amount is extremely large. More particularly, in the case that it is determined that shifting the transmission ratio to the LOW side by exactly the shift-down operation amount computed from the transmission ratio map X would make the engine speed increase to the vicinity of the permitted rotation speed (in other words, a rev-limit) of the engine 10, or make the engine speed exceed the rev-limit, an actual change amount of the transmission ratio map may be set smaller than the computed shift-down operation amount. In this case, the actual change amount of the transmission ratio map is inhibited to a maximum permitted shift-down operation amount.

More particularly, a maximum permitted shift-down operation amount is pre-set for the shift-down operation amount, and if the computed shift-down operation amount exceeds the maximum shift-down operation amount, the transmission ratio of the transmission mechanism 21 is shifted down by exactly the maximum shift-down operation amount. In other words, in this situation, the transmission ratio map used in the shift-down correction AT mode is a map in which the transmission ratio is shifted to the LOW side from the transmission ratio map X used in the AT mode by exactly the maximum shift-down operation amount.

—Detailed Explanation of Step S3-3—

Next, the "determined operation" and the "determined condition" of step S3-3 will be explained in more detail.

The "determined operation" and the "determined condition" of step S3-3 are not particularly limited so long as they are an operation and a condition from which it can be determined that the rider's acceleration intention or intention to actively use engine brake has ended or lessened.

For example, when at least one of the throttle opening degree, the engine speed and the vehicle speed satisfies a determined condition, the shift-down permission AT mode may be returned to from the shift-down correction AT mode. More particularly, when the throttle opening degree is equal to or less than a determined opening degree or less than a determined opening degree, or when the throttle opening degree has returned to the opening degree when the shift-down permission mode was selected, the shift-down permission AT mode may be returned to from the shift-down correction AT mode. For example, when an operation amount of the throttle operation member 71 is closed from the current operation position by more than 20% in terms of the operation amount, the shift-down permission AT mode may be returned to from the shift-down correction AT mode.

When the throttle opening degree is constant throughout a determined period, the shift-down permission AT mode may be returned to from the shift-down correction AT mode.

Alternatively, when the engine speed is equal to or more than a determined rotation speed, or when the engine speed has become larger than a determined engine speed, the shift-down permission AT mode may be returned to from the shift-down correction AT mode. More particularly, when the rev-limit is reached, the shift-down permission AT mode may be returned to from the shift-down correction AT mode.

When the vehicle speed is equal to or more than a determined vehicle speed, or more than a determined vehicle speed, the shift-down permission AT mode may be returned to from the shift-down correction AT mode. When the vehicle acceleration of the motorcycle 1 obtained by differentiating by time the vehicle speed is equal to or less than a determined acceleration or is less than a determined acceleration, the shift-down permission AT mode may be returned to from the shift-down correction AT mode.

In addition, for example, when a determined time has elapsed from when the shift-down correction AT mode was selected, the shift-down permission AT mode may be returned to from the shift-down correction AT mode. More particularly, when, for example, a period of 3 seconds to 120 seconds has elapsed from when the shift-down correction AT mode is selected, the shift-down permission AT mode may be returned to from the shift-down correction AT mode.

In addition, for example, in the shift-down correction AT mode, the shift-down permission AT mode may be returned to from the shift-down correction AT mode in accordance with the operation state of the brake levers 4c, caused by the rider. More particularly, when the brake levers 4c have been operated by the rider the shift-down permission AT mode may be returned to from the shift-down correction AT mode. Or, when a determined time has elapsed from when the rider starts to operate the brake levers 4c, the shift-down permission AT mode may be returned to from the shift-down correction AT mode. Alternatively, when operation of the brake levers 4c by the rider has been ceased, the shift-down permission AT mode may be returned to from the shift-down correction AT mode. For example, in the case that parallel use of engine brake is taken into consideration, it is particularly favorable that the shift-down permission AT mode is returned to from the shift-down correction AT mode when the rider ceases to operate the brake levers 4c.

In addition, for example, in the shift-down correction AT mode, when the shift up signal 105 is output to the ECU 5 when the rider operates the shift up switch 41, the shift-down permission AT mode may be returned to from the shift-down correction AT mode.

Furthermore, for example, in the shift-down correction AT mode, when the shift-down permission signal 101 is output to the ECU 5 when the rider operates the shift-down permission switch 43, the shift-down permission AT mode may be returned to from the shift-down correction AT mode.

"Shift-Down Permission Automatic MT Mode"

In this embodiment, as can be seen from FIG. 5, it is possible to shift from the automatic MT mode to a shift-down permission automatic MT mode. Here, the "shift-down permission automatic MT mode" is a shift mode within the shift-down permission mode in which, after shift-down has been performed in accordance with the operation state of the throttle operation member 71, until the shift-down is cancelled, the transmission ratio following the shift-down is maintained, and after the shift-down is cancelled, control is performed using the normal automatic MT mode.

Figure 10:
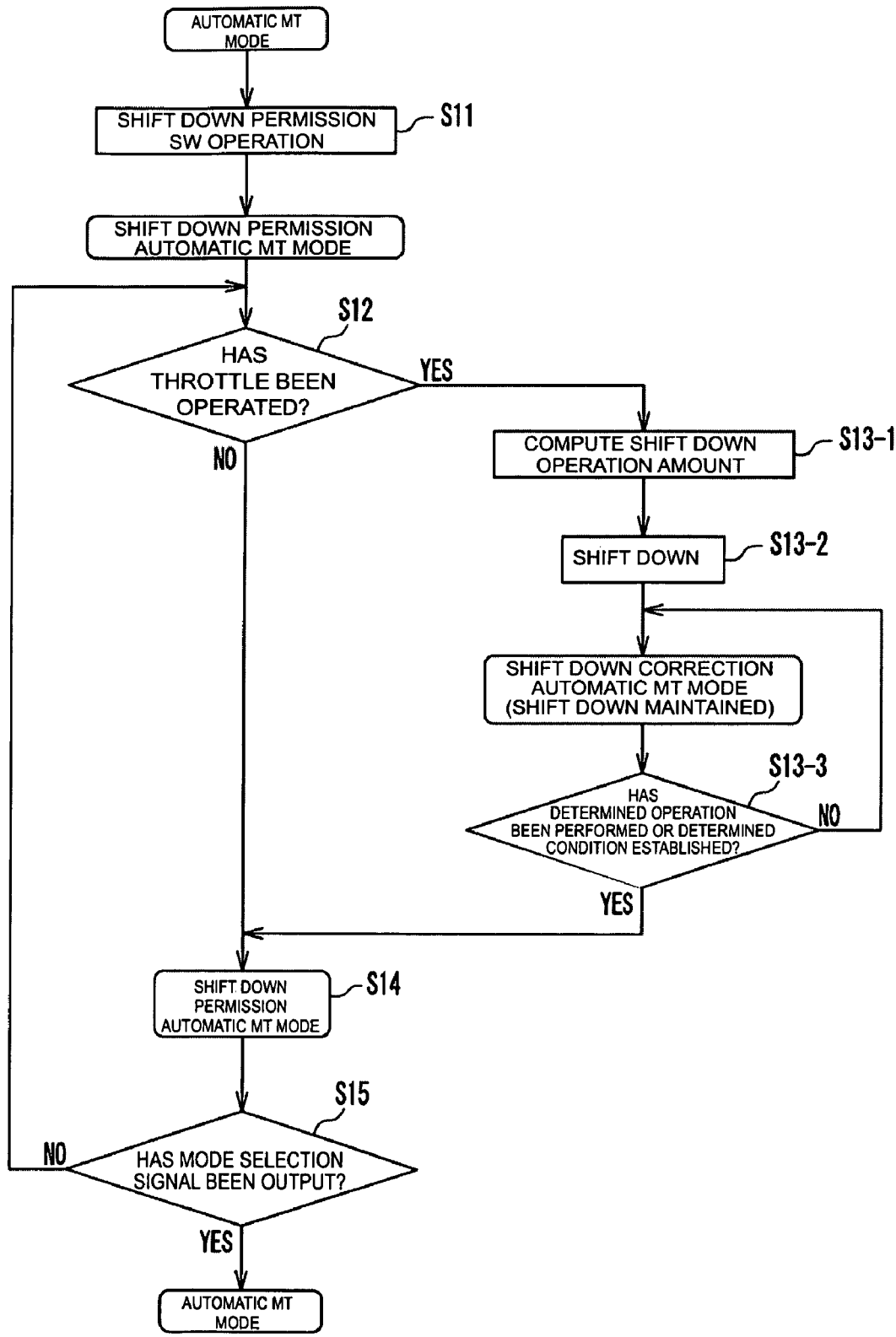
FIG. 10 is a flow chart of a shift-down permission automatic MT mode.

As shown in FIG. 10, at step S11, when the rider operates the shift-down permission switch 43, as shown in FIG. 4, the shift-down permission signal 101 is output to the ECU 5 from the shift-down permission switch 43. More particularly, the shift-down permission signal 101 is output to the shift mode selection portion 52. When the shift-down permission signal 101 is input to the shift mode selection portion 52, the shift mode selection portion 52 shifts from the automatic MT mode to the shift-down permission automatic MT mode. In other words, when the shift-down permission signal 101 is input, the shift mode selection portion 52 selects the shift-down permission automatic MT mode instead of the automatic MT mode. Note that, even after shifting to the shift-down permission automatic MT mode, control of the transmission ratio like that in the normal automatic MT mode is performed until an operation of the throttle operation member 71 is performed.

Next, as shown in FIG. 10, at step S12, it is determined whether or not the throttle operation member 71 has been operated. More particularly, the throttle operation signal 113 is output from the throttle operation member sensor 34 shown in FIG. 4 to the ECU 5. The ECU 5 determines whether or not the throttle operation member 71 has been operated by the rider based on the throttle operation signal 113. At step S12, if it is determined that the throttle operation member 71 has been operated, the routine proceeds to step S13-1.

At step S13-1, the shift-down operation amount computation portion 51 computes the shift-down operation amount. More specifically, in this embodiment, the shift-down operation amount is computed using the shift-down operation amount map memorized in the memory 57. First, the shift-down operation amount computation portion 51 reads the shift-down operation amount map memorized in the memory 57. The shift-down operation amount computation portion 51 applies to the shift-down operation amount map the operation amount of the throttle operation member 71 obtained from the throttle operation signal 113, the operation speed of the throttle operation member 71 computed by differentiating by time the operation amount, the vehicle speed obtained from the vehicle speed signal 112, and the engine speed obtained from the engine speed signal 109, thereby computing the shift-down operation amount. The computation of the shift-down operation amount performed at step S13-1 is substantially the same as the computation of the shift-down operation amount performed at step S3-1.

Next, following step S13-1, step S13-2 is performed. At step S13-2, shift-down of the transmission ratio of the transmission mechanism 21 is performed based on the shift-down operation amount computed at step S13-1. More particularly, the shift-down operation amount computation portion 51 outputs the computed shift-down operation amount to the transmission ratio control portion 55. The transmission ratio control portion 55 shifts down the transmission ratio of the transmission mechanism 21, among the transmission ratios of the predetermined first speed to fifth speed, to the transmission ratio that is closest to a transmission ratio that is shifted down by exactly the input shift-down operation amount from the current transmission ratio. After this, as shown in FIG. 10, the shift-down permission AT mode to the shift-down correction automatic MT mode. More particularly, in the shift-down correction automatic MT mode, the transmission ratio after shift-down is maintained. In other words, the shift-down state is maintained.

Note that, in this embodiment, an example is explained in which the transmission ratio control portion 55 shifts down the transmission ratio of the transmission mechanism 21, among the transmission ratios of the predetermined first speed to fifth speed, to the transmission ratio that is closest to a transmission ratio that is shifted down by exactly the input shift-down operation amount from the current transmission ratio. However, the invention is not limited to this configuration. For example, the transmission ratio control portion 55 may shift-down the transmission ratio of the transmission mechanism 21, among the transmission ratios of the predetermined first speed to fifth speed, to the transmission ratio that is closest to and to the LOW side of a transmission ratio that is shifted down by exactly the input shift-down operation amount from the current transmission ratio. Alternatively, the transmission ratio control portion 55 may shift-down the transmission ratio of the transmission mechanism 21, among the transmission ratios of the predetermined first speed to fifth speed, to the transmission ratio that is closest to and to the TOP side of a transmission ratio that is shifted down by exactly the input shift-down operation amount from the current transmission ratio.

Next, following step S13-2, step S13-3 is performed. At step S13-3 it is determined whether or not the determined operation has been performed on the motorcycle 1, and whether the determined condition of the motorcycle 1 is satisfied by the ECU 5. At step S13-3, if it is determined that the determined operation has not been performed on the motorcycle 1 and that the determined condition of the motorcycle 1 has not been established, the shift-down correction automatic MT mode continues to be used. On the other hand, at step S13-3, if it is determined that the determined operation has been performed on the motorcycle 1, or it is determined that the determined condition of the motorcycle 1 has been satisfied, the routine proceeds to step S14. Then, at step S14, the cancellation signal output portion 53 outputs the cancellation signal 107 to the shift-down cancellation portion 54. As a result, as shown in FIG. 5 and FIG. 10, the shift-down correction automatic MT mode is cancelled, and the shift-down permission automatic MT mode is returned to. Along with this, the transmission ratio of the transmission mechanism 21 is changed to the transmission ratio prior to shifting down at step S12-3. Note that, the "determined operation" and the "determined condition" of step S13-3 are the same as the "determined operation" and the "determined condition" of step S3-3 described in the explanation of the shift-down permission AT mode.

At step S12, in the case that it is determined that the throttle operation member 71 has not been operated, the routine similarly proceeds to step S14. More particularly, at step S12, in the case that it is determined that the throttle operation member 71 has not been operated, the shift-down permission MT mode is not shifted to the shift-down correction automatic MT mode, and the shift-down permission automatic MT mode is continued as is.

Next, following step S14, step S15 is performed. At step S15, it is determined whether or not the mode selection switch 44 has been operated and the mode selection signal 102 has been output from the mode selection switch 44 to the ECU 5. At step S15, if it is determined that the mode selection signal 102 has been output to the ECU 5, as shown in FIG. 5 and FIG. 10, the automatic MT mode is returned to from the shift-down permission automatic MT mode. On the other hand, if it is determined that the mode selection signal 102 has not been output to the ECU 5 at step S15, the routine returns to step S12 again.

Note that, in this embodiment, an example is explained in which setting is such that the automatic MT mode is returned to from the shift-down permission automatic MT mode when the mode selection signal 102 is output to the ECU 5. However, the invention is not limited to this setting. For example, in the shift-down permission automatic MT mode, when the shift-down permission signal 101 is output to the ECU 5, the automatic MT mode may be returned to from the shift-down permission automatic MT mode. Alternatively, in the shift-down permission automatic MT mode, when the shift up signal 105 or the shift-down signal 106 is output to the ECU 5, the automatic MT mode may be returned to from the shift-down permission automatic MT mode. In other words, at step S15, it may be determined whether or not the shift-down permission signal 101 has been output, or whether the shift up signal 105 or the shift-down signal 106 has been output.

Figure 11:
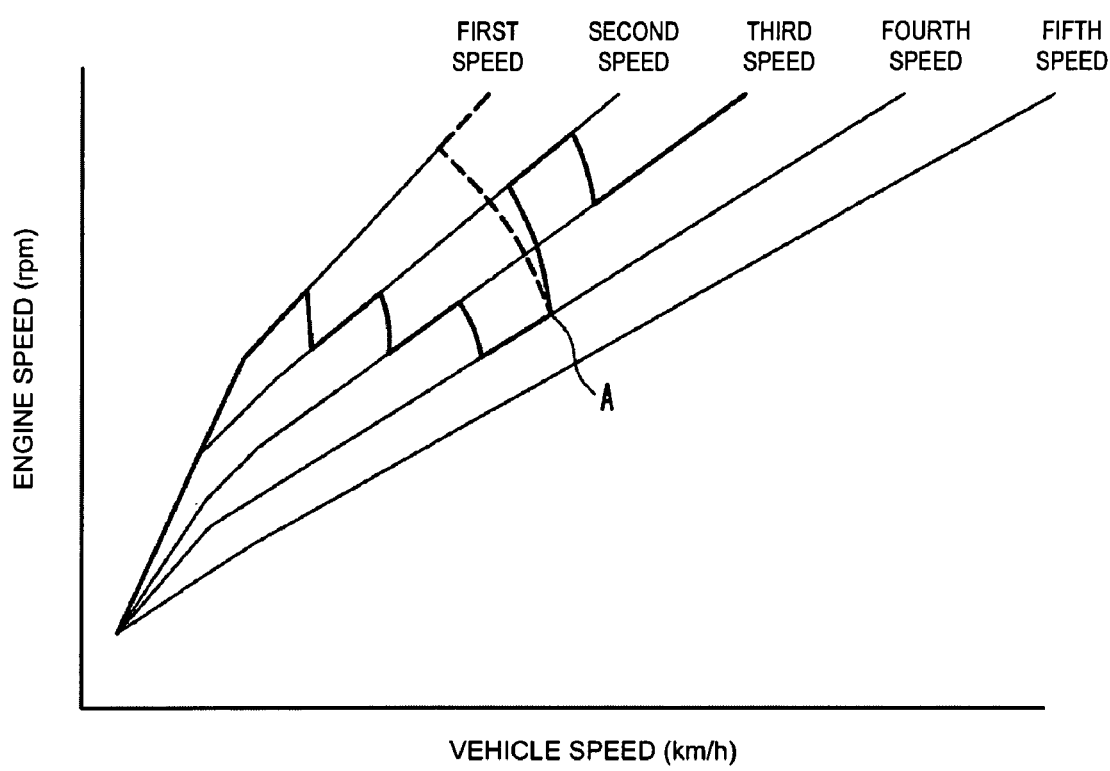
FIG. 11 is a V-N diagram of a shift-down correction automatic MT mode in a modified example.

Note that, in this embodiment, an example is explained in which, after shifting down at step S13-2, the shifted down transmission ratio is maintained. However, for example, as shown in FIG. 11, after shifting down, the transmission ratio may be automatically changed based on a transmission ratio control program that is to the LOW side of the normal automatic MT mode transmission ratio control program.

"Shift-Down Permission Manual MT Mode"

In this embodiment, as shown in FIG. 5, it is possible to shift from the manual MT mode to a shift-down permission manual MT mode. Here, the "shift-down permission manual MT mode" is a shift mode in which, after shift-down has been performed following operation of the throttle operation member 71, so long as the rider does not perform a shift change operation, the transmission ratio of the transmission mechanism 21 is fixed in one of the plurality of predetermined transmission ratios.

Figure 12:
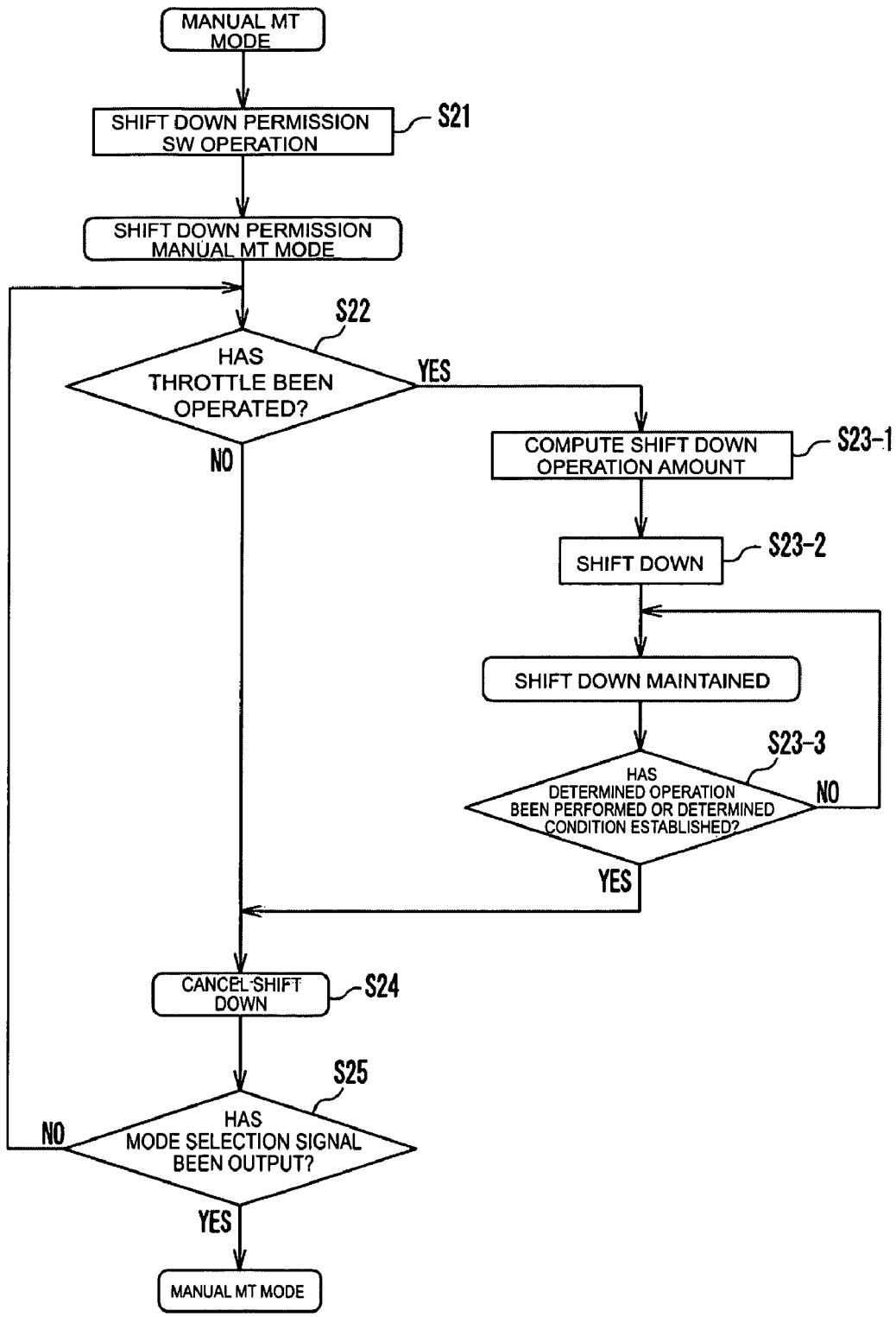
FIG. 12 is a flow chart of a shift-down permission manual MT mode.

Referring to FIG. 12, at step S21, when the rider operates the shift-down permission switch 43, as shown in FIG. 4, the shift-down permission signal 101 is output to the ECU 5 from the shift-down permission switch 43. More particularly, the shift-down permission signal 101 is output to the shift mode selection portion 52. When the shift-down permission signal 101 is input to the shift mode selection portion 52, the shift mode selection portion 52 causes the shift from the manual MT mode to the shift-down permission manual MT mode. In other words, when the shift-down permission signal 101 is input, the shift mode selection portion 52 selects the shift-down permission manual MT mode instead of the manual MT mode.

Next, as shown in FIG. 12, at step S22, it is determined whether or not the throttle operation member 71 has been operated. More particularly, the throttle operation signal 113 is output from the throttle operation member sensor 34 to the ECU 5 as shown in FIG. 4. The ECU 5 determines whether or not the rider has operated the throttle operation member 71 based on the throttle operation signal 113. At step S22, if it is determined that the throttle operation member 71 has been operated, the routine proceeds to step S23-1.

At step S23-1, the shift-down operation amount computation portion 51 computes the shift-down operation amount. In this embodiment, at step S23-1, the shift-down operation amount computation portion 51 reads the shift-down operation amount map memorized in the memory 57. The shift-down operation amount computation portion 51 applies to the shift-down operation amount map the operation amount of the throttle operation member 71 obtained from the throttle operation signal 113, the operation speed of the throttle operation member 71 computed by differentiating by time the operation amount, the vehicle speed obtained from the vehicle speed signal 112, and the engine speed obtained from the engine speed signal 109, thereby computing the shift-down operation amount. Note that, the "determined operation" and the "determined condition" of step S23-3 are the same as the "determined operation" and the "determined condition" of step S3-3 described in the explanation of the shift-down permission AT mode.

Next, following step S23-1, step S23-2 is performed. At step S23-2, shift-down of the transmission ratio of the transmission mechanism 21 is performed based on the shift-down operation amount computed at step S23-1. More particularly, the shift-down operation amount computation portion 51 outputs the computed shift-down operation amount to the transmission ratio control portion 55. The transmission ratio control portion 55 shifts down the transmission ratio of the transmission mechanism 21, among the transmission ratios of the predetermined first speed to fifth speed, to the transmission ratio that is closest to a transmission ratio that is shifted down by exactly the input shift-down operation amount from the current transmission ratio. After this, as shown in FIG. 12, the transmission ratio after shift-down is maintained. In other words, the shift-down state is maintained.

Figure 13:
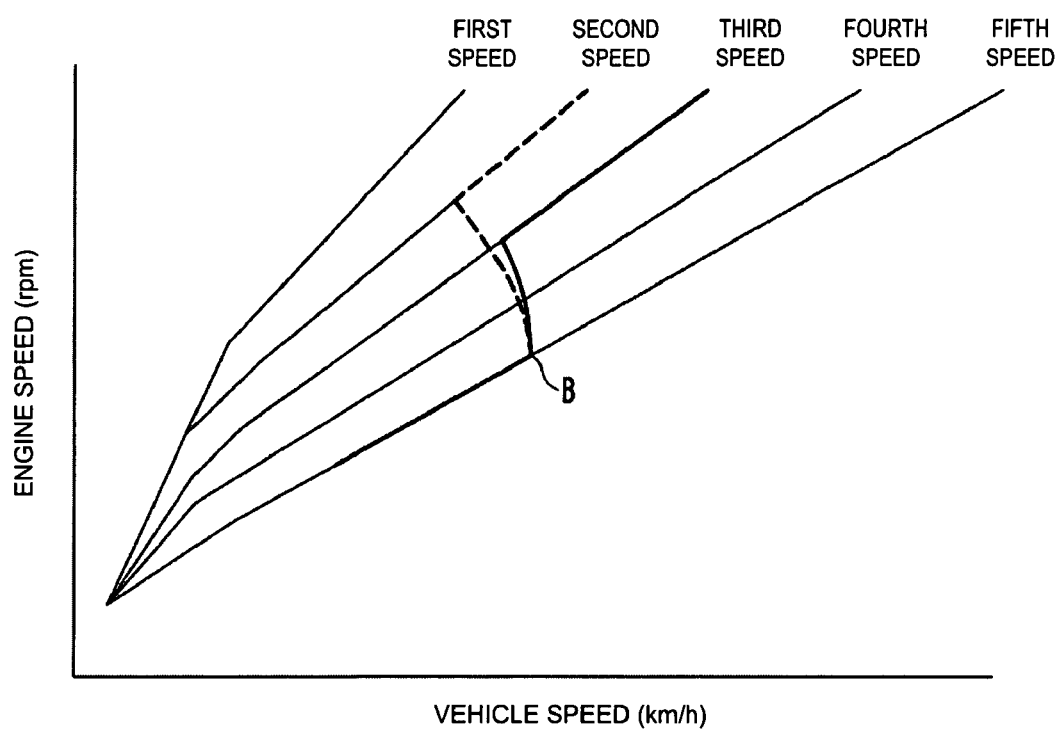
FIG. 13 is a V-N diagram of a shift-down permission correction MT mode.

For example, as shown in FIG. 13, in the shift-down permission automatic MT mode, if the throttle operation member 71 is operated a comparatively small degree when the transmission ratio of the transmission mechanism 21 is at point B, namely, fifth speed, the shift-down operation amount computation portion 51 computes a comparatively small shift-down operation amount. Then, the transmission ratio of the transmission mechanism 21 is shifted down, among the transmission ratios of the predetermined first speed to fifth speed, to the transmission ratio that is closest to a transmission ratio that is shifted down by exactly the computed shift-down operation amount from the transmission ratio of the transmission mechanism 21 at point B. In the example shown in FIG. 13, as shown by the solid line, the transmission ratio is shifted down to the third speed. Following shift-down, the shift is maintained at the third speed.

On the other hand, when the throttle operation member 71 is operated a comparatively large extent at point B, the shift-down operation amount computation portion 51 computes a comparatively large shift-down operation amount. Then, the transmission ratio of the transmission mechanism 21 is shifted down, among the transmission ratios of the predetermined first speed to fifth speed, to the transmission ratio that is closest to a transmission ratio that is shifted down by exactly the computed shift-down operation amount from the transmission ratio of the transmission mechanism 21 at point B. In the example shown in FIG. 13, as shown by the broken line, the transmission ratio is shifted down to the second speed. Following shift-down, the shift is maintained at the second speed.

Note that, in the shift-down permission manual MT mode as well, as in the above-described shift-down permission automatic AT mode, when the transmission ratio of the transmission mechanism 21 is shifted down by exactly the computed shift-down operation amount, in the case that the transmission ratio would become a transmission ratio further to the LOW side than the predetermined first speed that is furthest to the LOW side, the transmission ratio is shifted down to the first speed.

Note that, in this embodiment, an example is explained in which the transmission ratio control portion 55 shifts down the transmission ratio of the transmission mechanism 21, among the transmission ratios of the predetermined first speed to fifth speed, to the transmission ratio that is closest to a transmission ratio that is shifted down by exactly the input shift-down operation amount from the current transmission ratio. However, the invention is not limited to this configuration. For example, the transmission ratio control portion 55 may shift-down the transmission ratio of the transmission mechanism 21, among the transmission ratios of the predetermined first speed to fifth speed, to the transmission ratio that is closest to and to the LOW side of a transmission ratio that is shifted down by exactly the input shift-down operation amount from the current transmission ratio. Alternatively, the transmission ratio control portion 55 may shift-down the transmission ratio of the transmission mechanism 21, among the transmission ratios of the predetermined first speed to fifth speed, to the transmission ratio that is closest to and to the TOP side of a transmission ratio that is shifted down by exactly the input shift-down operation amount from the current transmission ratio.

Next, after step S23-2, step S23-3 is performed. At step S23-3 it is determined by the ECU 5 whether or not a determined operation has been performed on the motorcycle 1, and whether or not a determined condition of the motorcycle 1 is satisfied. At step S23-3, if it is determined that the determined operation has not been performed on the motorcycle 1, and that the determined condition of the motorcycle 1 is not satisfied, the shift-down correction automatic MT mode continues to be used. On the other hand, if it is determined at step S23-3 that the determined operation has been performed on the motorcycle 1 or that the determined condition of the motorcycle 1 has been satisfied, the routine proceeds to step S24. Then, at step S24, the cancellation signal 107 is output to the shift-down cancellation portion 54 from the cancellation signal output portion 53. As a result, the shift-down is cancelled. In other words, the transmission ratio of the transmission mechanism 21 is changed to the transmission ratio prior to shift-down. Note that, the "determined operation" and the "determined condition" of step S23-3 are the same as the "determined operation" and the "determined condition" of step S3-3 described in the explanation of the shift-down permission AT mode.

At step S22, in the case that it is determined that the throttle operation member 71 has not been operated, the routine similarly proceeds to step S24. More particularly, at step S22, in the case that it is determined that the throttle operation member 71 has not been operated, the transmission ratio prior to shifting to the shift-down permission manual MT mode continues to be used as is.

Next, following step S24, step S25 is performed. At step S25, it is determined whether or not the mode selection switch 44 has been operated and the mode selection signal 102 has been output from the mode selection switch 44 to the ECU 5. At step S25, if it is determined that the mode selection signal 102 has been output to the ECU 5, as shown in FIG. 5 and FIG. 12, the manual MT mode is returned to from the shift-down permission manual MT mode. On the other hand, if it is determined that the mode selection signal 102 has not been output to the ECU 5 at step S25, the routine returns to step S22 again.

Note that, in this embodiment, an example is explained in which setting is such that the manual MT mode is returned to from the shift-down permission manual MT mode when the mode selection signal 102 is output to the ECU 5. However, the invention is not limited to this setting. For example, in the shift-down permission manual MT mode, when the shift-down permission signal 101 is output to the ECU 5, the manual MT mode may be returned to from the shift-down permission manual MT mode. Alternatively, in the shift-down permission manual MT mode, when the shift up signal 105 or the shift-down signal 106 is output to the ECU 5, the manual MT mode may be returned to from the shift-down permission manual MT mode. In other words, at step S25, it may be determined whether or not the shift-down permission signal 101 has been output, or whether the shift up signal 105 or the shift-down signal 106 has been output.

Operation and Advantages.

In this embodiment, in the AT mode, the shift-down permission switch 43 can be operated in advance thus easily allowing shift-down to be performed using an extremely simple operation that is a normally performed operation, namely, operation of the throttle operation member 71. As a result, it is easier to perform the kick down operation or actively use engine brake in the AT mode.

In addition, in this embodiment, the shift-down amount is computed in accordance with the operation state of the motorcycle 1 such as the operation amount of the throttle operation member 71. Accordingly, shift-down in accordance with the operation state of the motorcycle 1 can be performed just by operating the throttle operation member 71. In other words, the rider can easily adjust the shift-down amount in accordance with his/her intention.

For example, even in known motorcycles in which both the AT mode and the MT mode can be selected, the shift-down operation is possible. However, in the case of known motorcycles, in order to shift-down the transmission ratio of the transmission, it is necessary to perform at least 2 operations, namely:

1. operating a mode selection switch to change from the AT mode to the MT mode, and
2. operating a shift-down switch to shift-down.

Moreover, in the case of a large shift-down, in addition to the above two operations, it is necessary to operate the shift-down switch again. As a result, not only is the operation of the transmission ratio of the transmission complicated, but also it is problematic to swiftly perform the shift-down operation.

In addition, in the manual MT mode, if a shift-down of a large magnitude, more particularly, of two speeds or more, is performed, it is necessary to perform the shift change operation a plurality of times.

As compared to this, in this embodiment, as described above, the shift-down permission switch 43 can be operated to set the shift-down permission mode in advance, thereby allowing a shift-down with a shift-down amount that matches the rider's intention to be rapidly performed just by performing an extremely simple operation that is performed during normal operation, namely, operation of the throttle operation member 71. Accordingly, the rider can easily and rapidly perform the kick down operation or actively use engine brake. In addition, the rider is able to concentrate more on driving.

Furthermore, in this embodiment, it is possible to shift to the shift-down permission mode from not only the AT mode but also from the automatic MT mode and the manual MT mode. As a result, in the automatic MT mode or the manual MT mode as well, similarly, the shift-down permission mode can be selected in advance, thereby allowing a shift-down with a shift-down amount that matches the rider's intention to be rapidly performed just by performing an extremely simple operation that is performed during normal operation, namely, operation of the throttle operation member 71.

In addition, in this embodiment, in certain situations, the shift-down operation amount is computed to be zero. More particularly, for example, in the case that the operation amount of the throttle operation member 71 is equal to or less than the determined operation amount or the operation speed is equal to or less than a determined operation speed, the shift-down operation amount is computed to be zero. As a result, in the case that the rider does not intend to shift-down, it is possible to inhibit shift-down from automatically being performed. In other words, it is possible to perform operation that more accurately reflects the intentions of the rider.

In addition, even in a case like when it is anticipated that slipping will occur if shift-down is performed, the shift-down operation amount is computed to be zero. As a result, running can be performed in a manner that reflects the rider's intentions and that is highly safe.

Note that, even if the operation amount or operation speed of the throttle operation member 71 is the same, if the vehicle speed or engine speed is different, the favorable shift-down operation amount also changes. Here, in this embodiment, the shift-down operation amount is computed having taken into consideration not only the operation amount and the operation speed of the throttle operation member 71, but also the vehicle speed and the engine speed. As a result, a more favorable shift-down operation amount can be computed.

In addition, because the shift-down operation amount map is used in the computation of the shift-down operation amount, computation of the shift-down operation amount is easier. Accordingly, the configuration of the shift-down operation amount computation portion 51 can be simplified.

In this embodiment, in the shift-down correction AT mode, the transmission ratio is constantly controlled to a transmission ratio that is shifted down by exactly the shift-down operation amount from the transmission ratio computed from the transmission ratio map used in computing the transmission ratio of the transmission mechanism 21 in the normal AT mode. In other words, in the shift-down correction AT mode, the transmission ratio is computed using a new transmission ratio map that is obtained by shifting the transmission ratio map used to compute the transmission ratio of the transmission mechanism 21 in the normal AT mode by exactly the shift-down operation amount to the LOW side. As a result, it is possible to utilize the acceleration effect or the deceleration effect of shift-down throughout the entire shift speed region. Accordingly, the motorcycle 1 can accelerate more smoothly.

In addition, in this embodiment, when the determined operation has been performed on the motorcycle 1, and the determined condition of the motorcycle 1 has been satisfied, shift-down is cancelled. In this manner, in this embodiment, cancellation of shift-down can be performed with an extremely simple operation.

In particular, if setting is adopted in which shift-down is cancelled when at least one of the throttle opening degree, the engine speed and the vehicle speed has satisfied a determined condition, or if setting is adopted in which shift-down is cancelled when a determined time period has elapsed following selection of the shift-down permission mode, it is possible to cancel shift-down without the rider performing a special operation. As a result, cancellation of shift-down is particularly simple. Accordingly, it is easier for the rider to concentrate on driving.

Furthermore, in this case, because a special operation is not required to cancel shift-down, shift-down can be cancelled more assuredly. In other words, it is possible to inhibit cancellation of shift-down from being forgotten due to the rider's lack of attention or the like.

In addition, in this case, it is not necessary to especially provide a return switch for canceling the shift-down. Accordingly, the structure of the operation switches can be simplified. As a result, cost reduction of the motorcycle 1 can be promoted.

In addition, in the shift-down permission mode, as a result of adopting setting where shift-down is cancelled in accordance with the operation state of the brake levers 4c resulting from the rider, or the operation of the shift up switch 41 or the shift-down permission switch 43 by the rider, the shift-down can be continued until the rider ceases to want to shift-down. Then, when the rider wants to cancel shift-down, shift-down is reliably cancelled. In other words, it is possible to more reliably reflect the rider's wants.

In addition, as a result of adopting setting where, when the rider's operation of the brake levers 4c is ended, the shift-down is cancelled, engine brake can be actively used even more effectively.

Furthermore, by using the shift-down permission switch 43 or the shift up switch 41 also as a switch to cancel shift-down, the structure of the operation switch can be simplified. As a result, the layout of the operation switches can be more freely designed. In addition, operation of the operation switches is inhibited from becoming complicated. Along with this, the cost of the motorcycle 1 can be reduced.

In this embodiment, each of the various types of switch like the shift-down permission switch 43 is a push type switch. Thus, the rider can easily operate the operation switches. In this embodiment, button type switches are used for the operation switches. However, the operation switches may also be lever type switches.

In addition, in this embodiment, each of the various types of switches like the shift-down permission switch 43 can be operated by the rider's thumb 60a. The rider's thumb 60a can be moved relatively freely as compared to the other fingers while steering the motorcycle 1. As a result, it is possible to improve the operability of each of the switches such as the shift-down permission switch 43. When the brake levers 4c are gripped, the other fingers can be moved extremely freely, and thus simultaneous brake operation and operation of the various types of switches is comparatively easy.

Furthermore, in this embodiment, each of the various types of switches such as the shift-down permission switch 43 is disposed on the left grip 4a that is on the opposite side to the right grip 4b that is used to operate the throttle. As a result, it is relatively easy to operate the operation switches simultaneous to operating the throttle.

First Modified Example

Next, a modified example of the above-described embodiment will be explained. Note that, in the modified example explained below, the explanation uses the same reference characters as in the above-described embodiment for structural member that have substantially the same function, and repeated explanation is omitted.

In the above-described embodiment, an example is explained in which the AT mode is shifted to the shift-down permission AT mode, the automatic MT mode is shifted to the shift-down permission automatic MT mode, and the manual MT mode is shifted to the shift-down permission manual MT mode, respectively. However, the invention is not limited to this configuration.

Figure 14:
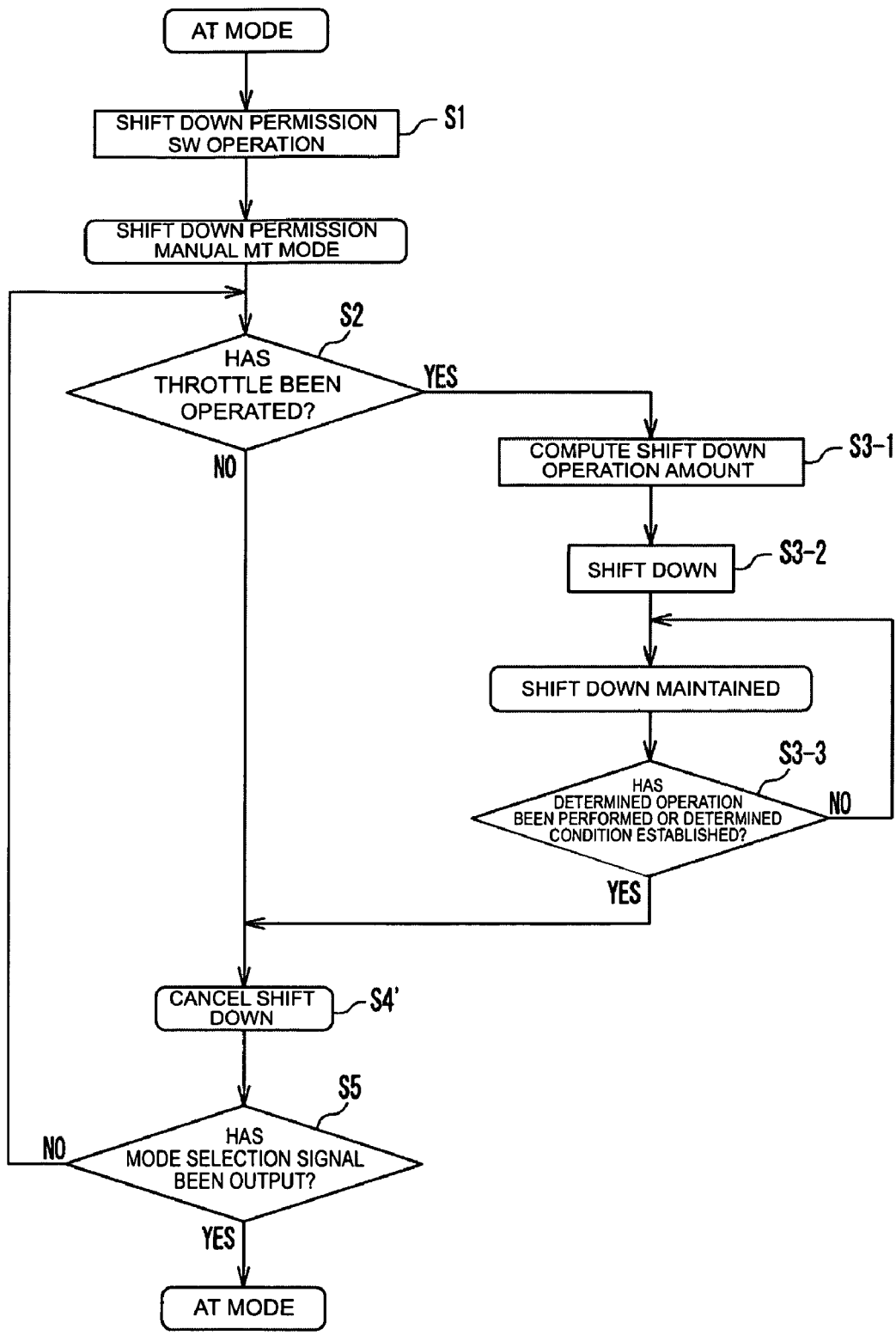
FIG. 14 is a flow chart of a shift-down permission manual MT mode of a first modified example.
Figure 15:
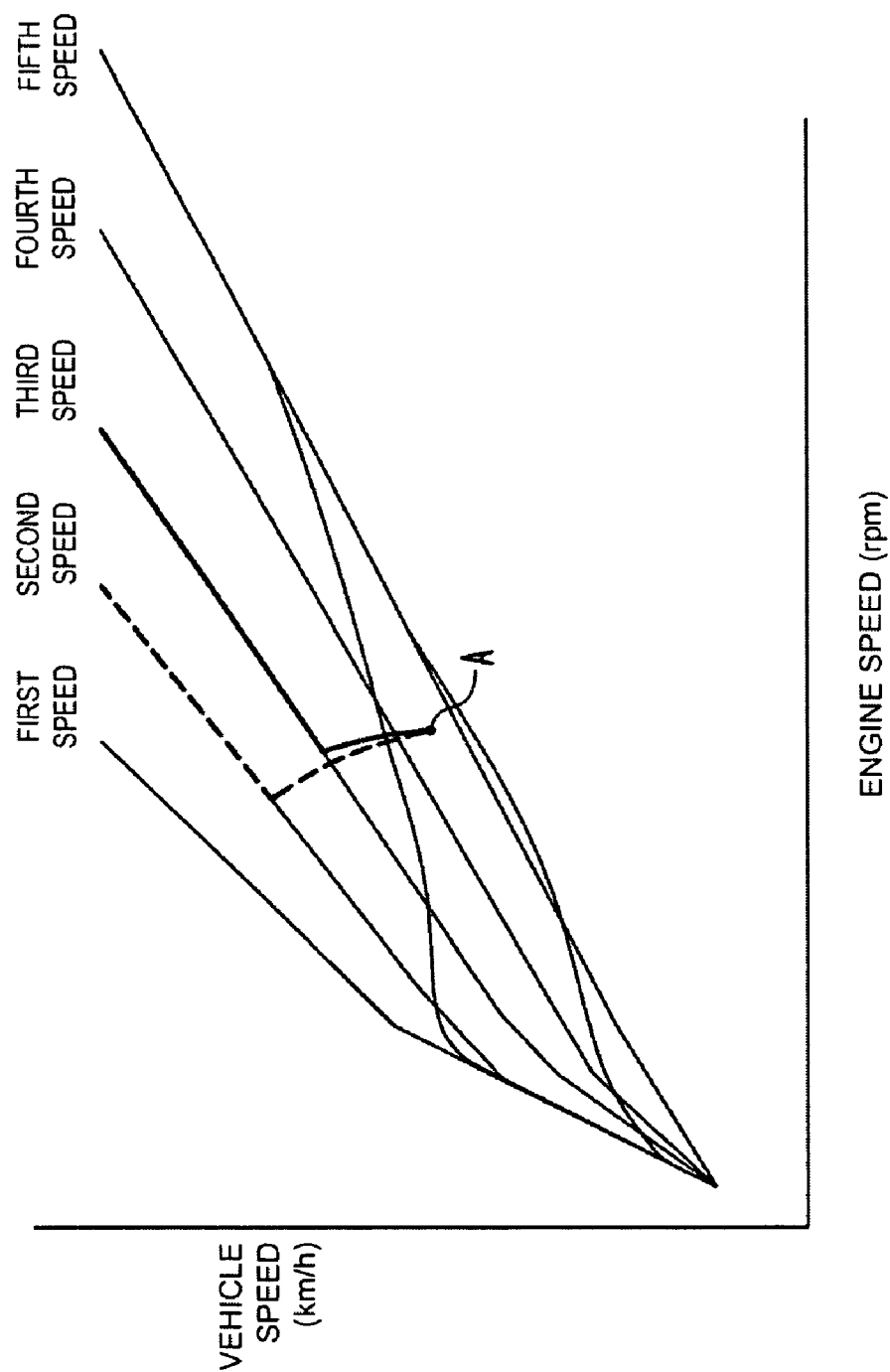
FIG. 15 is a V-N diagram of a shift-down correction manual MT mode of the first modified example.

For example, as shown in FIG. 14, a configuration may be adopted in which, in the AT mode, when the shift-down permission switch 43 is operated, the AT mode is shifted to the shift-down permission manual MT mode (refer to step S1). In this case, as shown in FIG. 15, after the shift-down is performed following operation of the throttle operation member 71 at point A, the transmission ratio is maintained at one of predetermined plurality of transmission ratios in accordance with the computed shift-down operation amount.

In this first modified example, at step S3-3, if it is determined that the determined operation has been performed on the motorcycle 1 or that the determined condition of the motorcycle 1 has been satisfied, the routine proceeds to step S4'. Then, at step S4' shift-down is cancelled.

In addition, the AT mode may be shifted to the shift-down permission automatic MT mode. Or, the automatic MT mode may be shifted to the shift-down permission AT mode or the shift-down permission manual MT mode. Or, the manual MT mode may be shifted to the shift-down permission automatic MT mode or the shift-down permission AT mode.

Furthermore, a configuration may be adopted in which the rider can select which shift-down permission mode is shifted to from the AT mode from among the shift-down permission AT mode, the shift-down permission automatic MT mode, and the shift-down permission manual MT mode. Further a configuration may be adopted in which the rider can select which shift-down permission mode is shifted to from the automatic MT mode from among the shift-down permission AT mode, the shift-down permission automatic MT mode, and the shift-down permission manual MT mode. Further, a configuration may be adopted in which the rider can select which shift-down permission mode is shifted to from the manual MT mode from among the shift-down permission AT mode, the shift-down permission automatic MT mode, and the shift-down permission manual MT mode.

Second Modified Example

In the above-described embodiment, an example is explained in which the shift-down permission switch 43 is provided separately, and the shift-down permission switch 43 is operated to shift to the shift-down permission mode. However, the invention is not limited to this configuration. In the second modified example, an example will be explained in which the shift-down permission switch 43 is not provided separately, and the shift-down switch 42 is operated to shift to the shift-down permission mode.

Figure 16:
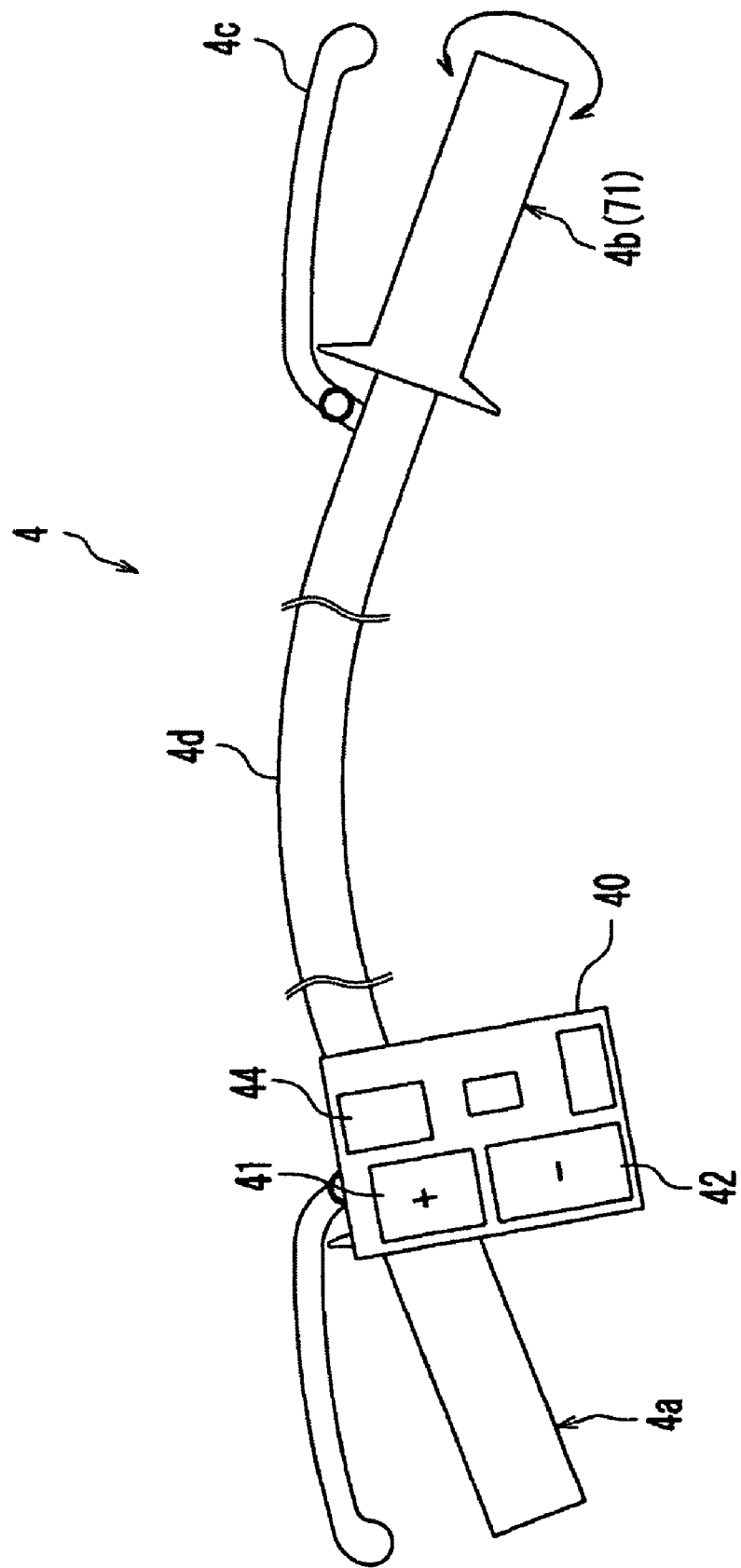
FIG. 16 shows an outline of the overall structure of a handle section of a second modified example.

FIG. 16 shows an outline of the overall structure of the handle 4 section in the second modified example. In the second modified example, the shift-down permission switch 43 is not provided in the switch box 40. Only the shift up switch 41 and the shift-down switch 42 are disposed on the left side of the switch box 40. Because the number of switches disposed at the left side of the switch box 40 is comparatively fewer in this manner, the shift up switch 41 and the shift-down switch 42 can be made bigger than they respectively were in the above-described embodiment.

Figure 17:
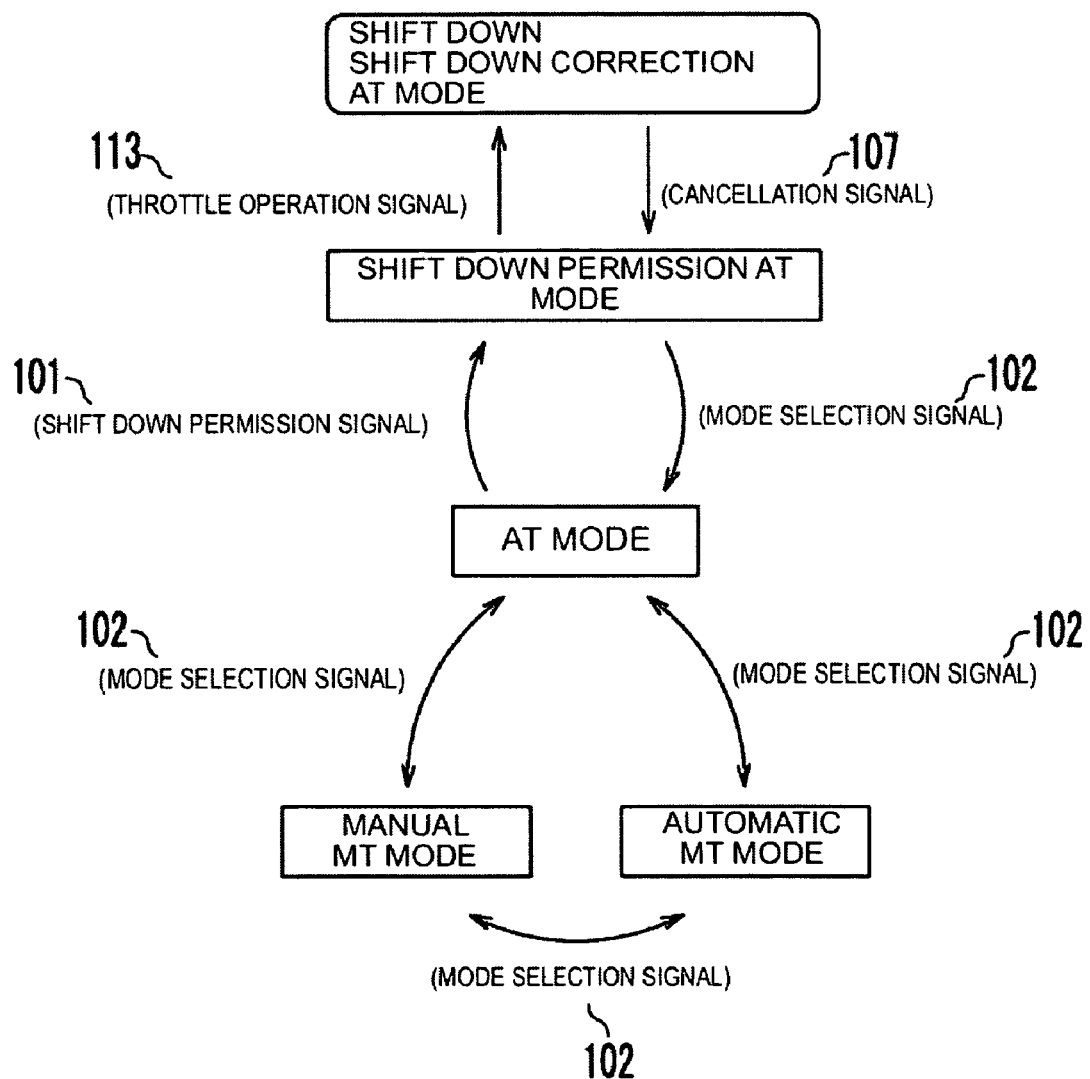
FIG. 17 is a conceptual diagram showing shift modes of the second modified example.

As shown in FIG. 17, in the second modified example, it is possible to shift from the AT mode to the shift-down permission AT mode. However, it is not possible to shift from the automatic MT mode or the manual MT mode to the shift-down permission mode.

Figure 18:
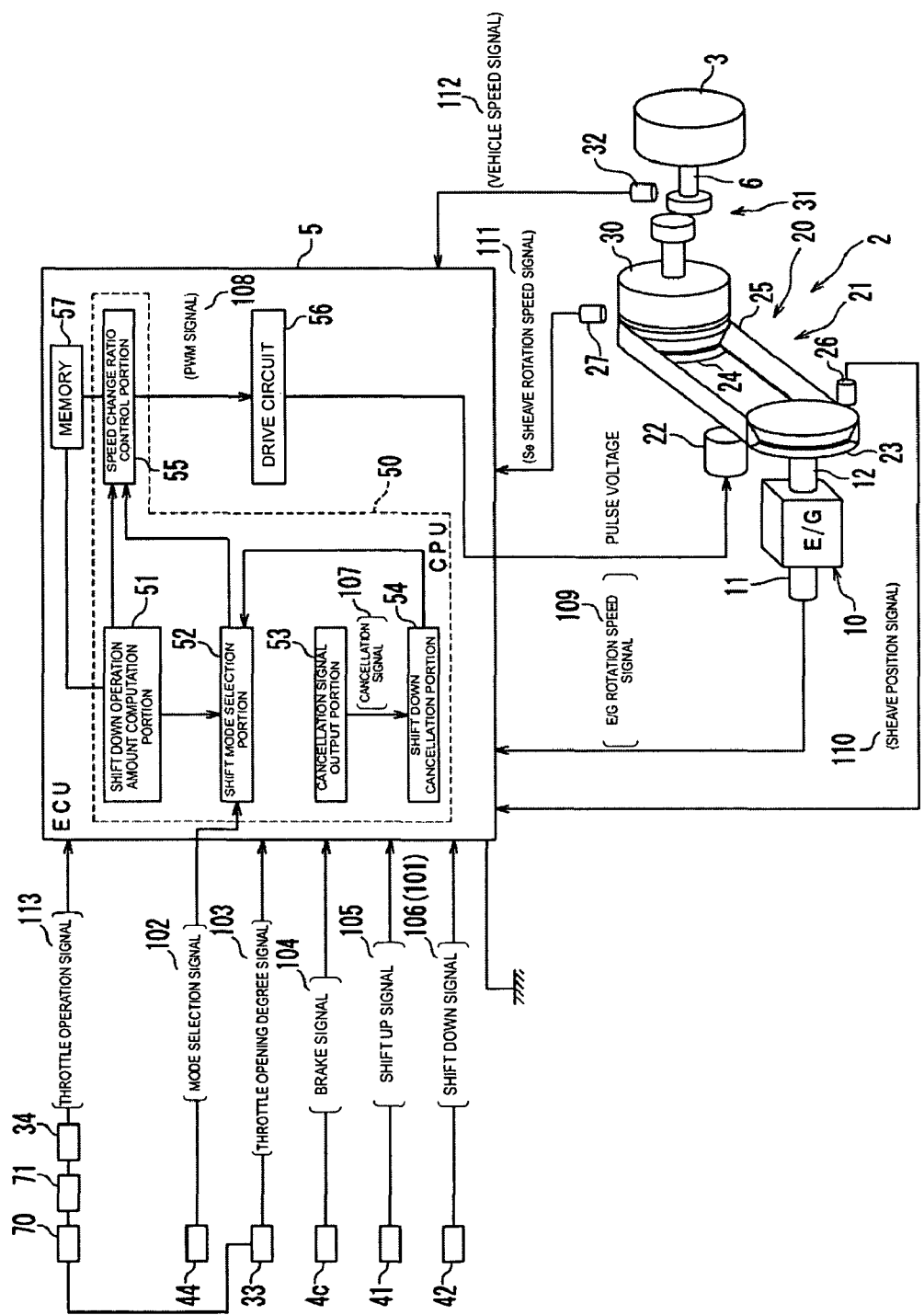
FIG. 18 is a block diagram of a control device of the second modified example.
Figure 19:
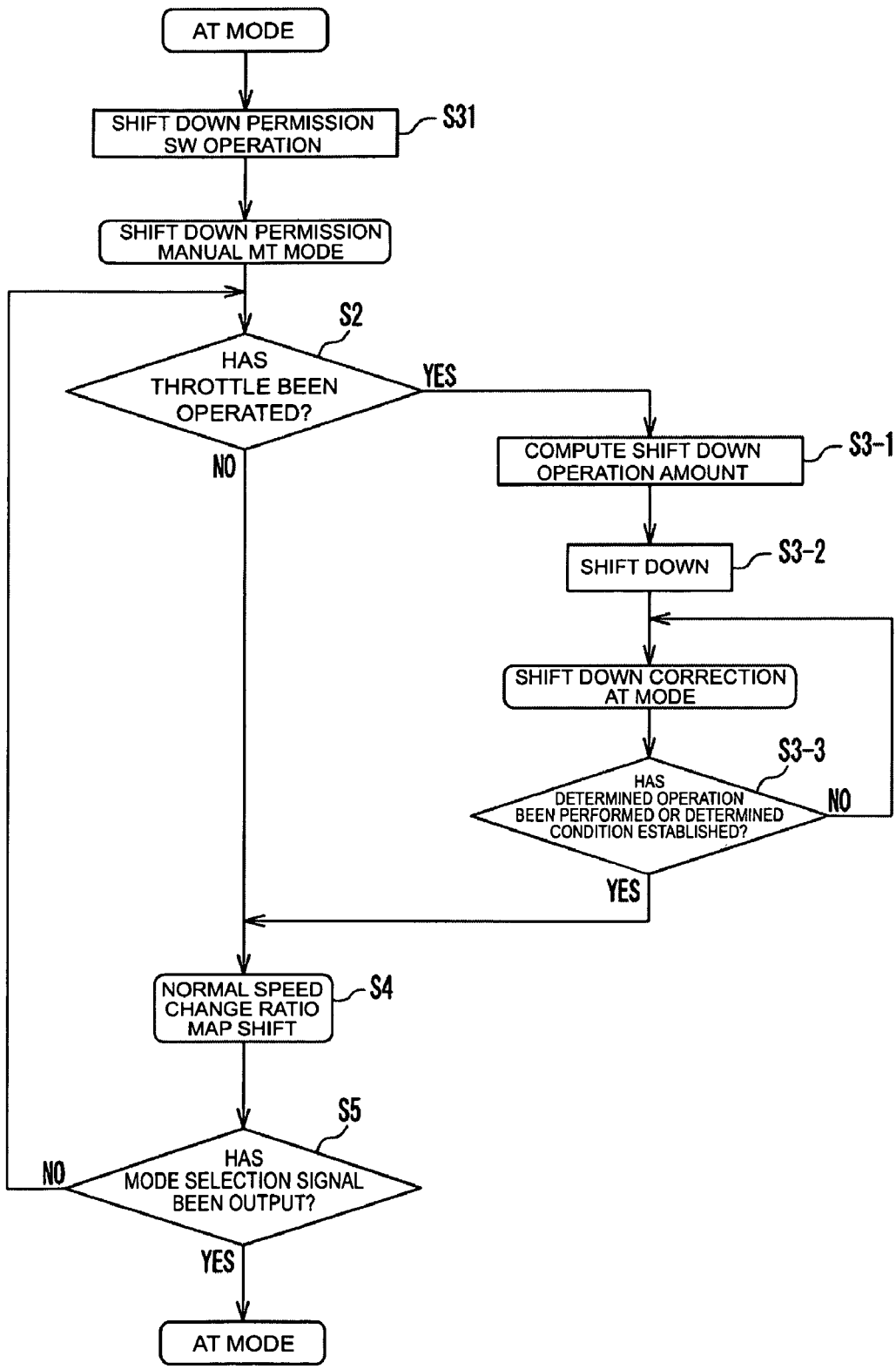
FIG. 19 is a flow chart of a shift-down permission AT mode of the second modified example.

As can be seen from FIG. 18, in the second modified example, in the AT mode, the shift-down signal 106 output by operation of the shift-down switch 42 serves as the shift-down permission signal 101. In other words, as shown in FIG. 19, in the AT mode, at step S31, when the rider operates the shift-down switch 42, the shift-down signal 106 as the shift-down permission signal 101 is output to the ECU 5. When the shift-down signal 106 is input to the ECU 5, the shift-down permission AT mode is selected by the shift mode selection portion 52. With regard to the other steps S2 to S5, they are the same as steps S2 to S5 explained in the embodiment.

Operation and Advantages.

In the second modified example, the AT mode is shifted to the shift-down permission mode by operating the shift-down switch 42. As a result, it is not necessary to separately provide the shift-down permission switch 43, and thus the shift up switch 41 and the shift-down switch 42 can respectively be made larger to that extent. Accordingly, rider operability is improved. In addition, because the number of operation switches is reduced, rider operation is easier.

Third Modified Example

In the above embodiment, an example is explained in which the AT mode is shifted to the shift-down permission mode when the shift-down permission signal 101 is output from the shift-down permission switch 43. However, the invention is not limited to this configuration. For example, as in the third modified example, the AT mode may be shifted to the shift-down permission mode when the mode selection signal 102 is output from the mode selection switch 44.

Figure 20:
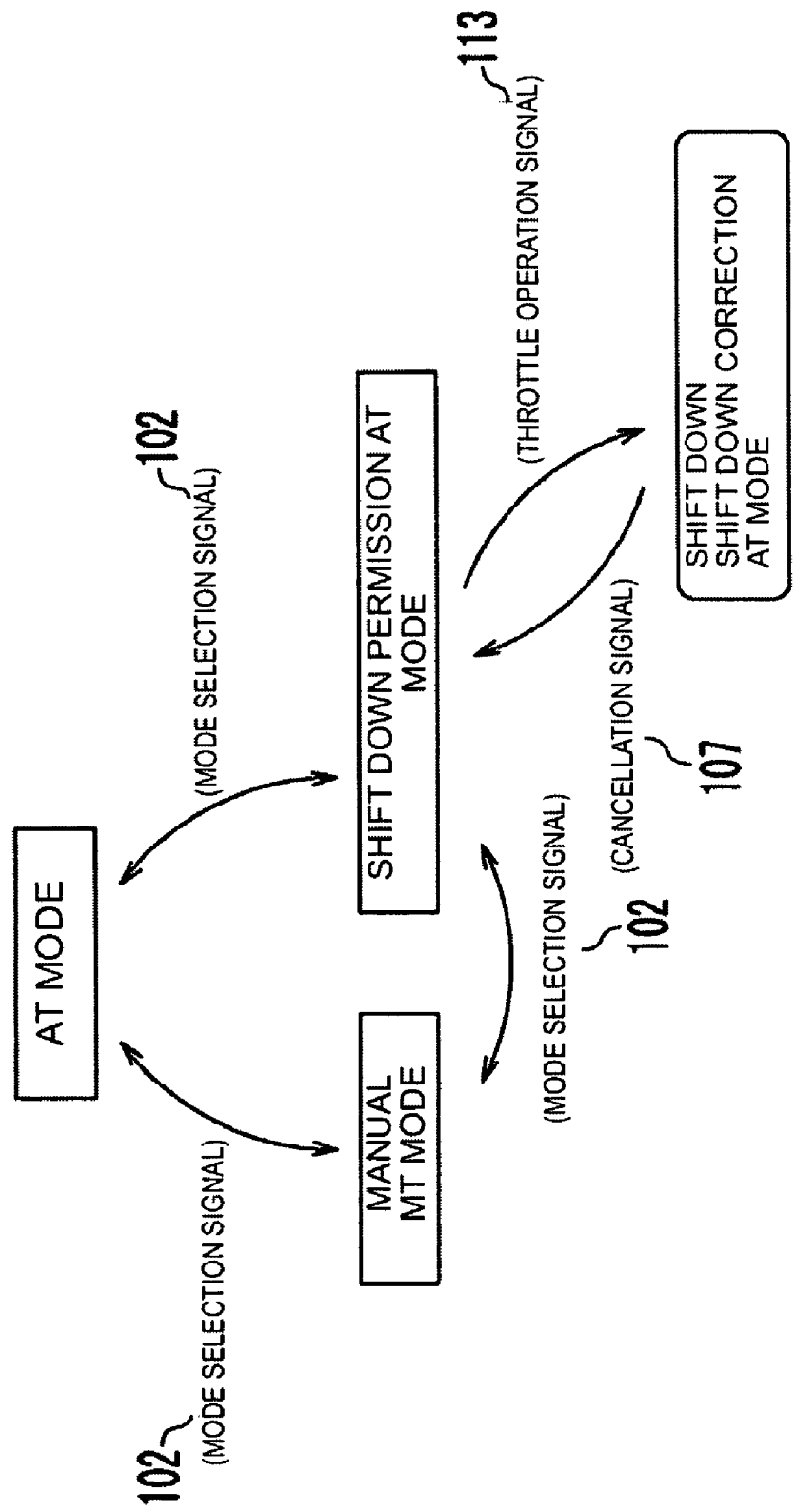
FIG. 20 is a conceptual diagram that shows shift modes of a third modified example.

More particularly, as shown in FIG. 20, setting may be adopted in which the AT mode, the shift-down permission mode and the manual MT mode are switched when the mode selection signal 102 is output. More particularly, in the third modified example, in the AT mode, when the mode selection signal 102 is output, the shift-down permission AT mode is switched to. In the shift-down permission mode, when the mode selection signal 102 is output, the manual MT mode is switched to. In the manual MT mode, when the mode selection signal 102 is output, the AT mode is switched to. In addition, in the shift-down permission mode, as in the above-described embodiment, a configuration may be adopted in which shift-down is performed and shifting to the shift-down correction AT mode is performed based on the throttle operation signal 113. In the shift-down correction AT mode, the shift mode may return to the shift-down correction AT mode when the cancellation signal 107 is output. In addition, setting may be adopted in which the AT mode, the shift-down permission mode and the manual MT mode are switched when the shift-down permission signal 101 is output from the shift-down permission switch 43, instead of the mode selection signal 102.

Fourth Modified Example

Figure 21:
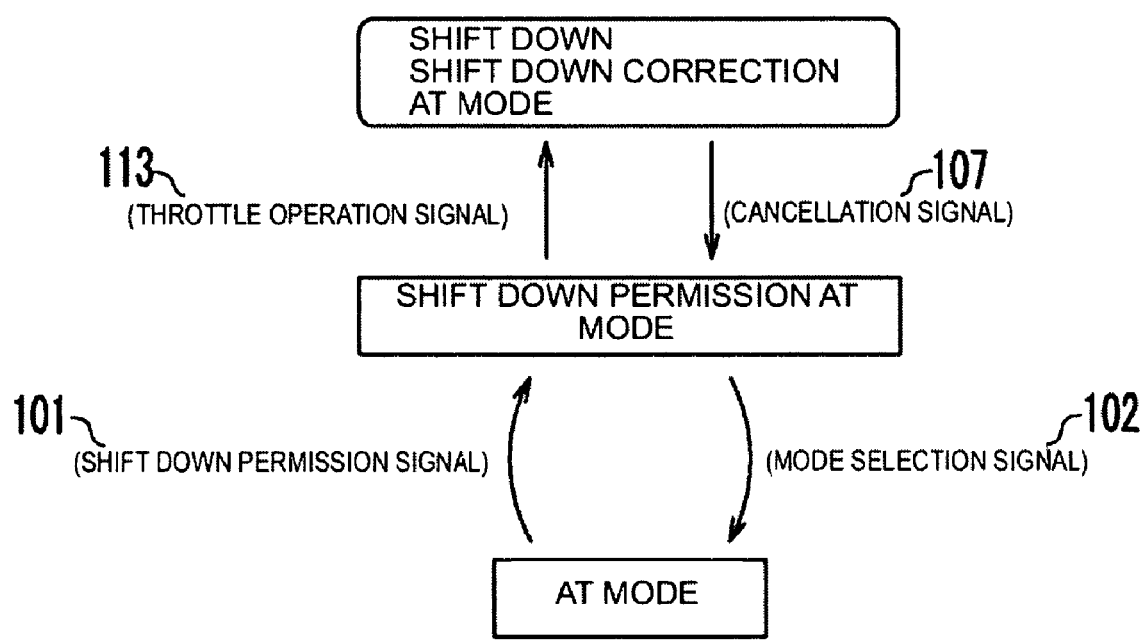
FIG. 21 is a conceptual diagram that shows shift modes of a fourth modified example.

In the above embodiment, an example is explained in which it is possible to select the AT mode as well as the manual MT mode and the automatic MT mode. However, the invention is not limited to this configuration. For example, as shown in FIG. 21, a configuration may be adopted in which it is only possible to select the AT mode, the shift-down permission mode and the shift-down correction AT mode. In this case, there is no need to separately provide, for example, the shift up switch 41, the shift-down switch 42, and the like. As a result, the shift-down permission switch 43 can be made larger. Note that, in the fourth modified example, in the shift-down permission AT mode, the AT mode is returned to when the mode selection signal 102 is output. However, in the shift-down permission AT mode, the AT mode may be returned to when the shift-down permission signal 101 is output.

Furthermore, for example, a configuration may be adopted in which, in addition to the AT mode, the shift-down permission mode and the shift-down correction AT mode, just one of the automatic MT mode and the manual MT mode can be selected. Moreover, a configuration may be adopted in which it is possible to select shift modes other than the AT mode, the automatic MT mode and the manual MT mode.

Fifth Modified Example

Figure 22:
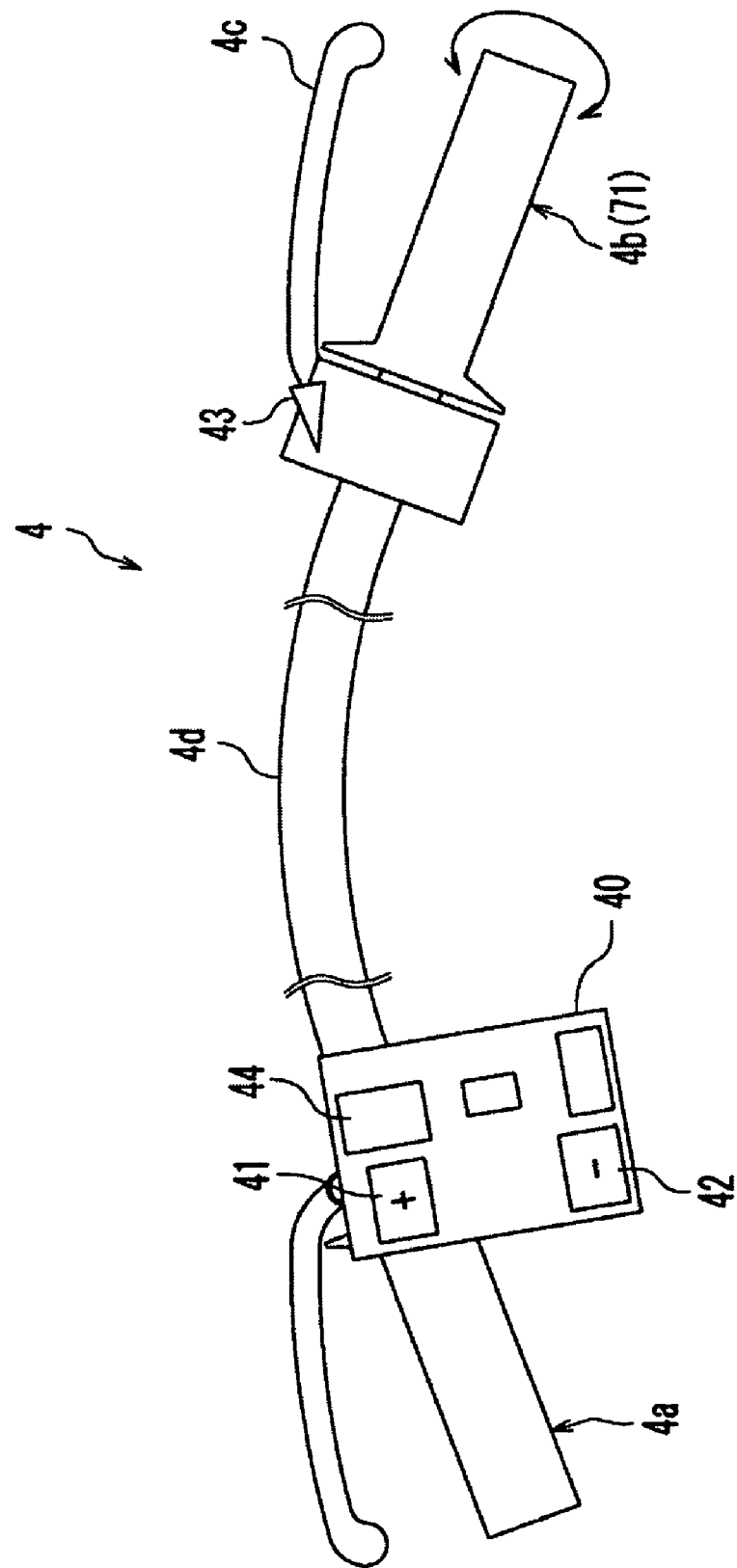
FIG. 22 shows an outline of the overall structure of a handle section of a fifth modified example.

In the above embodiment, as shown in FIG. 2, an example is explained in which the shift-down permission switch 43 is disposed in the switch box 40 disposed on the left grip 4a. However, the invention is not limited to this structure. For example, as shown in FIG. 22, the shift-down permission switch 43 may be disposed on the right grip 4b. As in the fifth modified example, among the mode selection switch 44 and the shift-down permission switch 43, one of the switches may be disposed on the right grip 4b, and the other of the switches may be disposed on the left grip 4a, thereby allowing operability of the mode selection switch 44 and the shift-down permission switch 43 to be improved.

In addition, as in the fifth modified example, if the shift-down permission switch 43 is disposed on the right grip 4b, the shift-down permission switch 43 may be disposed at a position where it can be operated by the thumb of the right hand of the rider. Alternatively, the shift-down permission switch 43 may be disposed at a position where it can be operated by the index finger of the right hand of the rider.

Furthermore, the mode selection switch 44 may be disposed on the right grip 4b, and the shift-down permission switch 43 may be disposed on the left grip 4a.

Other Modified Examples

In the above embodiment, an example is explained in which the throttle operation member sensor 34 and the throttle opening degree sensor 33 are provided separately. However, in the case that the throttle 70 and the throttle operation member 71 are directly connected by wire or the like, the throttle operation member sensor 34 and the throttle opening degree sensor 33 may be the same sensor. For example, the throttle opening degree sensor 33 may perform the role of the throttle operation member sensor 34 as well.

In the above embodiment, an example is explained in which a belt type ECVT is used as the electronically controlled transmission. However, the electronically controlled transmission may be an ECVT other than a belt type ECVT. For example, the electronically controlled transmission may be a toroidal type ECVT.

In the above embodiment, an example of an embodiment of the invention is explained in which as an example, the motorcycle 1 is a scooter type. However, the straddle-type vehicle of the invention is not limited to the above motorcycle 1. The straddle-type vehicle of the invention may be a motorcycle in the narrow definition of the word, a moped, or an off-road vehicle. In addition, the straddle-type vehicle of the invention may be an ATV (All Terrain Vehicle) or the like.

In the above embodiment, an example is explained in which each of the various types of switches like the shift up switch 41, the shift-down switch 42, the shift-down permission switch 43, and the mode selection switch 44 are button type switches that are pushed. However, each of the various types of switches may be a lever that is pushed. In addition, each of the various types of switches may be a rotating switch with a knob that can be moved between a plurality of positions.

In the above embodiment, an example is explained in which a PWM controlled motor 22 is used as the actuator that changes the transmission ratio of the transmission 20. However, in the invention, the type of the actuator that changes the transmission ratio of the transmission 20 is not particularly limited. For example, the actuator that changes the transmission ratio of the transmission 20 may be a PAM (pulse amplitude modulation) controlled motor. In addition, the actuator that changes the transmission ratio of the transmission 20 may be a step motor. Alternatively, the actuator that changes the transmission ratio of the transmission 20 may be a hydraulic actuator or the like.

In the above embodiment, an example is explained in which the shift-down operation amount is computed based on the shift-down operation amount map. However, in the invention, the computation method for computing the shift-down operation amount is not particularly limited. For example, computation may be performed using a determined function or the like based on the vehicle condition of the motorcycle 1.

In the above embodiment, an example is explained in which, in the shift-down permission AT mode, so long as the computed shift-down operation amount does not exceed the maximum shift-down operation amount, as a basic principle, a transmission ratio map is used that is shifted by exactly the computed shift-down amount to the LOW side from the transmission ratio map used in the AT mode. In other words, in the above embodiment, an example is explained in which, in the shift-down permission AT mode, as a basic principle, a shift-down of exactly the computed shift-down operation amount is performed. However, in the shift-down permission AT mode, a shift-down of exactly the computed shift-down operation amount need not always be performed.

For example, the number of transmission ratio maps used in the shift-down permission AT mode may be limited. More particularly, if the transmission ratio maps used in the shift-down permission AT mode are just the transmission ratio maps Y and Z shown in FIG. 9, in the case that the computed shift-down operation amount is equal to or more than a determined shift-down operation amount, the transmission ratio may be computed using the transmission ratio map Z, and in the case that the computed shift-down operation amount is less than the determined shift-down operation amount, the transmission ratio may be computed using the transmission ratio map Y.

In the above embodiment, an example is explained in which the shift mode is progressively changed each time the mode selection switch 44 is operated. However, for example, a mode selection switch for selecting the AT mode, a mode selection switch for selecting the automatic MT mode, and a mode selection switch for selecting the manual MT mode may be separately provided.

A cancellation switch for canceling the shift-down permission mode may be separately provided. In this case, the cancellation switch may be provided on the left grip 4*a* along with the shift-down permission switch 43. Alternatively, the cancellation switch may be provided on the right grip 4*b* on the opposite side to the shift-down permission switch 43.

Second Embodiment

Figure 23:
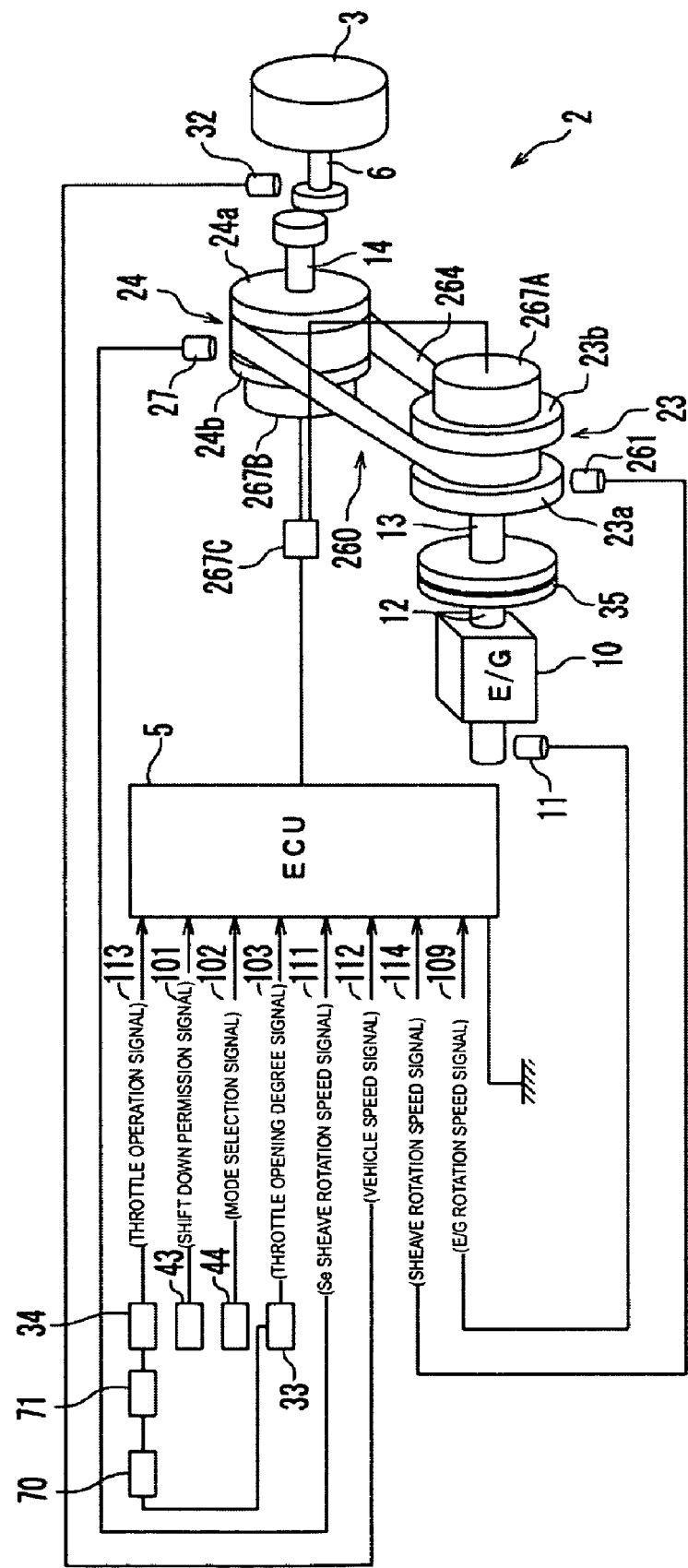
FIG. 23 is a block diagram that shows a control device of a second embodiment.

Instead of the transmission 20 in the first embodiment, for example, as shown in FIG. 23, a transmission 260 may be adopted including a metal belt as the V-belt. Note that, in FIG. 23, members or portions that perform the same operation as those in the transmission of the embodiment shown in FIG. 4 are denoted with the same reference characters. However, in FIG. 23, illustration of the internal elements of the ECU 5 has been omitted since they are the same as those in the first embodiment.

In this embodiment, the transmission 260 including a metal belt as the V-belt (hereinafter also referred to as a "metal belt CVT" as necessary) is modified in various ways, in addition to including a metal belt 264 as the V-belt, as shown in FIG. 23.

The metal belt CVT 260 includes a clutch 35, a primary rotation sensor 261, hydraulic cylinders 267A, 267B, and a hydraulic control valve 267C.

The clutch 35 is disposed between the output shaft 12 of the engine 10 and an input shaft 13 of the metal belt CVT 260. The clutch 35 connects/disconnects the transmission of power between the output shaft 12 of the engine 10 and the input shaft 13 of the metal belt CVT 260. The clutch 35 of the embodiment is an electronically controlled multi-disc clutch. Accordingly, connection and disconnection of the clutch 35 is performed automatically based on electronic control. When the clutch 35 is engaged, driving force of the engine 10 is transmitted via the clutch 35 to the primary sheave 23. The driving force transmitted to the primary sheave 23 is transmitted to the secondary sheave 24 via the belt 264.

The primary rotation speed sensor 261 detects the rotation speed of the primary sheave 23. The primary rotation speed sensor 261 outputs the detected rotation speed of the primary sheave 23 to the ECU 5 as a sheave rotation speed signal 114.

The primary sheave 23 and the secondary sheave 24 are respectively provided with a movable sheave body 23*a*, 24*a* and a fixed sheave body 23*b*, 24*b*. The movable sheave body 23*b* has a structure that allows it to move in the axial direction of the input shaft 13 of the metal belt 260. In addition, the movable sheave body 24*b* has a structure that allows it to move in the axial direction of the output shaft 14 of the metal belt CVT 260.

The primary rotation sensor 261 detects the rotation speed of the primary sheave 23. In this embodiment, the ECU 5 computes the transmission ratio of the metal belt CVT 260 using the ratio of the rotation speed of the primary sheave 23 detected by the primary rotation sensor 261 and the vehicle speed of the straddle-type vehicle detected by the vehicle speed sensor 32. More specifically, the transmission ratio of the metal belt CVT 260 is computed in ECU 5 using the ratio of the sheave rotation speed signal 114 and the vehicle speed signal 112. Note that, the transmission ratio of the metal belt CVT 260 may be computed using the ratio of the rotation speed of the primary sheave 23 detected by the primary rotation sensor 261 and the rotation speed of the secondary sheave 24 detected by the secondary sheave rotation speed sensor 27. More specifically, the transmission ratio of the metal belt CVT 260 may be computed in the ECU 5 using the ratio of the sheave rotation speed signal 114 and the secondary sheave rotation speed signal 111.

The hydraulic cylinder 267A adjusts the groove width of the primary sheave 23. In this embodiment, the hydraulic cylinder 267A adjusts the groove width of the primary sheave 23 by applying a pressing force to the movable sheave body 23b of the primary sheave 23. Further, the hydraulic cylinder 267B adjusts the groove width of the secondary sheave 24. In this embodiment, the hydraulic cylinder 267B adjusts the groove width of the secondary sheave 24 by applying a pushing force to the movable sheave body 24b of the secondary sheave 24. The hydraulic control valve 267C is a valve that adjusts the hydraulic pressure applied to the hydraulic cylinders 267A, 267B. The hydraulic control valve 267C performs control such that, when the hydraulic pressure of one hydraulic cylinder 267A (267B) of the hydraulic cylinders 267A, 267B is increased, the hydraulic pressure of the other hydraulic cylinder 267B (267A) is reduced. The hydraulic control valve 267C is controlled by the ECU 5.

In the metal belt CVT 260, the transmission ratio of the metal belt CVT 260 is changed by the ECU 5 operating the hydraulic control valve 267C. The control of the ECU 5 is similar in manner to that in the first embodiment. Note that, in the metal belt CVT 260 according to this embodiment, the ECU 5 may use the rotation speed of the primary sheave 23 as a control target value, instead of using the engine speed as the control target value.

Industrial Applicability

As would be readily apparent to those in the art based on this disclosure, aspects of the present invention have wide industrial applicability. According to some embodiments, e.g., aspects of the present invention can be used, e.g., in an ECVT equipped vehicle.

Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

Reference Numerals and Signs

To facilitate reference, the following chart helps to depict reference numerals used for components according to the preferred embodiments. This section is not intended to limit the broadest interpretation of the terminology employed, but to be used to facilitate easy reference. The interpretation of the terminology should be done based upon the foregoing specification descriptions and discussions.

| | |
|---|---|
| 1 | Motorcycle |
| 3 | Rear wheel (Driving wheel) |
| 4 | Handle |
| 4a | Left grip |
| 4b | Right grip |
| 4c | Brake levers |
| 5 | ECU (Control unit) |
| 10 | Engine (Driving source) |
| 11 | Engine rotation speed sensor |
| 20 | Transmission |
| 21 | Transmission mechanism |
| 32 | Vehicle speed sensor |
| 33 | Throttle opening degree sensor |
| 34 | Throttle operation member sensor |
| 35 | Clutch |
| 41 | Shift up switch |
| 42 | Shift-down switch |
| 43 | Shift-down permission switch |
| 44 | Mode selection switch |
| 50 | CPU (Computation unit) |
| 51 | Shift-down operation amount computation portion |
| 52 | Shift mode selection portion |
| 53 | Cancellation signal output portion |
| 54 | Shift-down cancellation portion |
| 55 | Transmission ratio control portion |
| 57 | Memory |
| 60a | Thumb |
| 70 | Throttle |
| 71 | Throttle operation member |
| 101 | Shift-down permission signal |
| 102 | Mode selection signal |
| 103 | Throttle opening degree signal |
| 107 | Cancellation signal |
| 109 | Engine speed signal |
| 110 | Sheave position signal |
| 112 | Vehicle speed signal |
| 113 | Throttle operation signal |
| 114 | Sheave rotation speed signal |
| 260 | Metal belt CVT |
| 261 | Primary rotation sensor |
| 267C | Hydraulic control valve |

What is claimed is:

1. A control device for an electronically controlled transmission disposed between a driving source and a driving wheel of a straddle-type vehicle that is capable of continuously changing a transmission ratio,
wherein the straddle-type vehicle includes
a shift-down permission switch that outputs a shift-down permission signal to the control device,
a throttle operation member that operates a throttle, and
a throttle operation member sensor that detects at least one of an operation amount of the throttle operation member and an operation speed of the throttle operation member,
wherein the control device comprises:
a transmission ratio control portion that controls the transmission ratio of the transmission according to a transmission ratio map;

a shift mode selection portion that is capable of selecting, in accordance with a running state of the straddle-type vehicle, an AT mode in which the transmission ratio control portion continuously changes the transmission ratio of the transmission, the shift mode selection portion being configured such that, in the AT mode, the AT mode is shifted to a shift-down permission mode when the shift-down permission signal is output; and a shift-down operation amount computation portion that computes a shift-down operation amount, different from a shift-down transmission ratio stored in the transmission ratio map, based on a vehicle state of the straddle-type vehicle that includes at least one of the operation amount of the throttle operation member and the operation speed of the throttle operation member, wherein the transmission ratio control portion, in the shift-down permission mode, shifts down the transmission ratio of the transmission based on the shift-down operation amount when the throttle is operated.

2. The control device according to claim 1, wherein the shift-down operation amount computation portion computes the shift-down operation amount to be zero in predetermined situations.

3. The control device according to claim 1, wherein the shift-down operation amount computation portion computes the shift-down operation amount to be zero when the operation amount of the throttle operation member is equal to or less than a predetermined operation amount, and when the operation speed of the throttle operation member is equal to or less than a predetermined operation speed.

4. The control device according to claim 1, wherein the shift mode selection portion is configured to select the AT mode or the shift-down permission mode only.

5. The control device according to claim 1, wherein the vehicle state in the transmission includes at least one of a vehicle speed of the straddle-type vehicle and a rotation speed of the driving source.

6. The control device according to claim 1, further comprising:

a memory that stores a shift-down operation amount map showing the inter-relationship between the vehicle state and the shift-down operation amount, wherein the shift-down operation amount computation portion computes the shift-down operation amount based on the shift-down operation amount map.

7. The control device according to claim 1, further comprising:

a memory that stores the transmission ratio map, wherein the transmission ratio control portion controls, in the AT mode, the transmission ratio of the transmission to a transmission ratio computed from the transmission ratio map, and in the shift-down permission mode, normally controls the transmission ratio of the transmission to a transmission ratio shifted down by the shift-down operation amount from the transmission ratio computed from the transmission ratio map.

8. The control device according to claim 1, wherein the shift mode selection portion is capable of selecting, in addition to the AT mode, an MT mode in which the transmission ratio control portion changes the transmission ratio of the transmission between a plurality of predetermined transmission ratios, wherein, in the shift-down permission mode, when the throttle is operated, the shift mode selection portion selects the MT mode, and wherein the transmission ratio control portion controls the transmission ratio of the transmission to a transmission ratio closest, among the plurality of predetermined transmission ratios, to a transmission ratio shifted down by exactly the shift-down operation amount from the current transmission ratio.

9. The control device according to claim 1, further comprising:

a cancellation signal output portion that outputs a cancellation signal when a predetermined operation has been performed on the straddle-type vehicle when the straddle-type vehicle is in a shift-down correction mode, and when a determined condition of the straddle-type vehicle has been satisfied; and a shift-down cancellation portion that cancels the shift-down correction mode when the cancellation signal is output in the shift-down permission mode.

10. The control device according to claim 9, wherein the cancellation signal output portion outputs the cancellation signal when at least one of a throttle opening degree of the straddle-type vehicle, a rotation speed of the driving source, and a vehicle speed of the straddle-type vehicle has satisfied a predetermined condition.

11. The control device according to claim 9, wherein the cancellation signal output portion outputs the cancellation signal when a predetermined period has elapsed following selection of the shift-down permission mode by the shift mode selection portion.

12. The control device according to claim 9, wherein the straddle-type vehicle further includes a brake, and wherein the cancellation signal output portion outputs the cancellation signal in accordance with an operation state of the brake.

13. The control device according to claim 9, wherein the shift mode selection portion is capable of selecting, in addition to the AT mode, an MT mode in which the transmission ratio control portion changes the transmission ratio of the transmission between a plurality of predetermined transmission ratios, wherein the straddle-type vehicle further includes a shift up switch that causes the transmission to shift up in the MT mode, and wherein the cancellation signal output portion outputs the cancellation signal when the shift up switch is operated in the shift-down permission mode.

14. The control device according to claim 9, wherein the cancellation signal output portion outputs the cancellation signal when the shift-down permission signal is output in the shift-down permission mode.

15. The control device according to claim 1, wherein the shift mode selection portion is capable of selecting, in addition to the AT mode, an MT mode in which the transmission ratio control portion changes the transmission ratio of the transmission between a plurality of predetermined transmission ratios, wherein the straddle-type vehicle further includes a shift-down switch that causes the transmission to shift-down in the MT mode, and wherein the shift-down switch and the shift-down permission switch are the same switch.

16. A control device for an electronically controlled transmission disposed between a driving source and a driving wheel of a straddle-type vehicle, wherein the straddle-type vehicle includes a shift-down permission switch that outputs a shift-down permission signal to the control device, a throttle operation member that operates a throttle, and a throttle operation member sensor that detects at least one of an operation amount of the throttle operation member and an operation speed of the throttle operation member, wherein the control device comprises:
a transmission ratio control portion that controls a transmission ratio of the transmission;
a shift mode selection portion that is capable of selecting an MT mode in which the transmission ratio control portion changes the transmission ratio of the transmission between a plurality of predetermined transmission ratios, the shift mode selection portion being configured such that, in the MT mode, the MT mode is shifted to a shift-down permission mode to when the shift-down permission signal is output; and
a shift-down operation amount computation portion that computes a shift-down operation amount based on a vehicle state of the straddle-type vehicle that includes at least one of the operation amount of the throttle operation member and the operation speed of the throttle operation member,
wherein the transmission ratio control portion, in the shift-down permission mode, automatically shifts down the transmission ratio of the transmission based on the shift-down operation amount when the throttle is operated.

17. A transmission, comprising:
an electronically controlled transmission mechanism, disposed between a driving source and a driving wheel of a straddle-type vehicle, that is capable of continuously changing a transmission ratio; and
a control unit that controls the transmission mechanism,
wherein the straddle-type vehicle includes
a shift-down permission switch that outputs a shift-down permission signal to the control unit,
a throttle operation member that operates a throttle, and
a throttle operation member sensor that detects at least one of an operation amount of the throttle operation member and an operation speed of the throttle operation member,
wherein the control unit includes
a transmission ratio control portion that controls the transmission ratio of the transmission according to a transmission ratio map,
a shift mode selection portion that is capable of selecting, in accordance with a running state of the straddle-type vehicle, an AT mode in which the transmission ratio control portion continuously changes the transmission ratio of the transmission, the shift mode selection portion being configured such that, in the AT mode, the AT mode is shifted to a shift-down permission mode when the shift-down permission signal is output, and
a shift-down operation amount computation portion that computes a shift-down operation amount, different from a shift-down transmission ratio stored in the transmission ratio map, based on a vehicle state of the straddle-type vehicle that includes at least one of the operation amount of the throttle operation member and the operation speed of the throttle operation member,
wherein the transmission ratio control portion, in the shift-down permission mode, shifts down the transmission ratio of the transmission based on the shift-down operation amount when the throttle is operated.

18. A straddle-type vehicle, comprising:
a driving source;
a driving wheel that is driven by the driving source;
a transmission including an electronically controlled transmission mechanism, disposed between the driving source and the driving wheel, that is capable of continuously changing a transmission ratio, and a control unit that controls the transmission mechanism;
a shift-down permission switch that outputs a shift-down permission signal to the control unit;
a throttle operation member that operates a throttle; and
a throttle operation member sensor that detects at least one of an operation amount of the throttle operation member and an operation speed of the throttle operation member,
wherein the control unit includes
a transmission ratio control portion that controls the transmission ratio of the transmission according to a transmission ratio map,
a shift mode selection portion that is capable of selecting, in accordance with a running state of the straddle-type vehicle, an AT mode in which the transmission ratio control portion continuously changes the transmission ratio of the transmission, the shift mode selection portion being configured such that, in the AT mode, the AT mode is shifted to a shift-down permission mode when the shift-down permission signal is output, and
a shift-down operation amount computation portion that computes a shift-down operation amount, different from a shift-down transmission ratio stored in the transmission ratio map, based on a vehicle state of the straddle-type vehicle that includes at least one of the operation amount of the throttle operation member and the operation speed of the throttle operation member,
wherein the transmission ratio control portion, in the shift-down permission mode, shifts down the transmission ratio of the transmission based on the shift-down operation amount when the throttle is operated.

19. The straddle-type vehicle according to claim 18, wherein the shift-down permission switch is disposed at a position where the shift-down permission switch can be operated by a thumb of a rider.

20. The straddle-type vehicle according to claim 18, further comprising:
a handle including a left grip and a right grip that are gripped by a rider,
wherein the shift-down permission switch is disposed at a right side section of the left grip.

21. The straddle-type vehicle according to claim 18,
wherein the shift mode selection portion is capable of selecting a plurality of shift modes including an MT mode in which the transmission ratio control portion changes the transmission ratio of the transmission between a plurality of predetermined transmission ratios, the AT mode, and the shift-down permission mode, and the shift mode selection portion successively changes the selected shift mode each time the shift-down permission signal is output.

22. A straddle-type vehicle, comprising:
a driving source;
a driving wheel that is driven by the driving source;
a transmission including an electronically controlled transmission mechanism, disposed between the driving source and the driving wheel of the straddle-type vehicle, and a control unit that controls the transmission mechanism;
a shift-down permission switch that outputs a shift-down permission signal to the control unit;
a throttle operation member that operates a throttle; and
a throttle operation member sensor that detects at least one of an operation amount of the throttle operation member and an operation speed of the throttle operation member,
wherein the control unit includes:
a transmission ratio control portion that controls the transmission ratio of the transmission;
a shift mode selection portion that is capable of selecting an MT mode in which the transmission ratio control portion changes the transmission ratio of the transmission between a plurality of predetermined transmission ratios, the shift mode selection portion being configured such that, in the MT mode, the MT mode is shifted to a shift-down permission mode when the shift-down permission signal is output; and a shift-down operation amount computation portion that computes a shift-down operation amount based on a vehicle state of the straddle-type vehicle that includes at least one of the operation amount of the throttle operation member and the operation speed of the throttle operation member, and wherein the transmission ratio control portion, in the shift-down permission mode, automatically shifts down the transmission ratio of the transmission based on the shift-down operation amount when the throttle is operated.

23. The straddle-type vehicle according to claim 22, wherein
the shift-down permission switch is disposed at a position where the shift-down permission switch can be operated by a thumb of a rider.

24. The straddle-type vehicle according to claim 22, further comprising:
a handle including a left grip and a right grip that are gripped by a rider,
wherein the shift-down permission switch is disposed at a right side section of the left grip.

25. The straddle-type vehicle according to claim 22,
wherein the shift mode selection portion is capable of selecting a plurality of shift modes including an AT mode in which the transmission ratio control portion continuously changes the transmission ratio of the transmission the MT mode, and the shift-down permission mode, and the shift mode selection portion successively changes the selected shift mode each time the shift-down permission signal is output.

* * * * *